United States Patent
Kato et al.

(10) Patent No.: US 12,437,359 B2
(45) Date of Patent: Oct. 7, 2025

(54) INFORMATION PROCESSING DEVICE, CONTROL METHOD, PROGRAM, AND STORAGE MEDIUM

(71) Applicants: PIONEER CORPORATION, Tokyo (JP); PIONEER SMART SENSING INNOVATIONS CORPORATION, Tokyo (JP)

(72) Inventors: Masahiro Kato, Saitama (JP); Masami Suzuki, Saitama (JP)

(73) Assignees: PIONEER CORPORATION, Tokyo (JP); PIONEER SMART SENSING INNOVATIONS CORPORATION, Tokyo (JP)

(*) Notice: Subject to any disclaimer, the term of this patent is extended or adjusted under 35 U.S.C. 154(b) by 238 days.

(21) Appl. No.: 18/036,132
(22) PCT Filed: Nov. 8, 2021
(86) PCT No.: PCT/JP2021/041005
§ 371 (c)(1),
(2) Date: May 9, 2023
(87) PCT Pub. No.: WO2022/102577
PCT Pub. Date: May 19, 2022

(65) Prior Publication Data
US 2023/0401671 A1    Dec. 14, 2023

(30) Foreign Application Priority Data
Nov. 13, 2020   (JP) ................. 2020-189517

(51) Int. Cl.
*G06T 3/40* (2024.01)
*G01C 21/30* (2006.01)
*G06T 7/73* (2017.01)

(52) U.S. Cl.
CPC ............... *G06T 3/40* (2013.01); *G01C 21/30* (2013.01); *G06T 7/74* (2017.01); *G06T 2207/10028* (2013.01); *G06T 2207/30252* (2013.01)

(58) Field of Classification Search
CPC ... G06T 3/40; G06T 7/74; G06T 2207/10028; G06T 2207/30252; G01C 21/30;
(Continued)

(56) References Cited

U.S. PATENT DOCUMENTS 10,810,445 B1   10/2020  Kangaspunta
2014/0309841 A1  10/2014  Hara et al.
(Continued)

FOREIGN PATENT DOCUMENTS

CN   111239763 A   6/2020
JP   2019-040445 A   3/2019
(Continued)

OTHER PUBLICATIONS

Akai, Naoki et al., "Autonomous Driving Based on Accurate Localization Using Multilayer LiDAR and Dead Reckoning", 2017 IEEE 20th International Conference on Intelligent Transportation Systems, Jan. 26, 2022, in 6 pages.
(Continued)

*Primary Examiner* — Anne Marie Antonucci
*Assistant Examiner* — Luis G Del Valle
(74) *Attorney, Agent, or Firm* — PROCOPIO, CORY, HARGREAVES & SAVITCH LLP

(57) ABSTRACT

The controller 13 of the in-vehicle device 1 acquires point cloud data outputted by a lidar 2. Then, the controller 13 generates processed point cloud data obtained by downsampling the point cloud data. The controller 13 matches the processed point cloud data with voxel data VD which represents a position of an object with respect to each voxel that is a unit area and thereby associates a measurement point of the processed point cloud data with the each voxel. Then, the controller 13 changes the size of the subsequent
(Continued)

down-sampling based on the associated measurement points number Nc which is the number of measurement points associated with the each voxel among the measurement points of the processed point cloud data.

11 Claims, 22 Drawing Sheets

(58) Field of Classification Search
CPC .. G01C 21/005; G06V 2201/12; G06V 10/20; G06V 20/58; G01S 7/4808; G01S 17/89; G01S 17/931; G08G 1/0112; G08G 1/0133; G08G 1/04
See application file for complete search history.

(56) References Cited

U.S. PATENT DOCUMENTS

| | | |
|---|---|---|
| 2019/0346271 A1 | 11/2019 | Zhang et al. |
| 2020/0175726 A1* | 6/2020 | Kuma ................... H04N 19/46 |
| 2020/0265259 A1 | 8/2020 | Paul et al. |
| 2020/0271454 A1* | 8/2020 | Kato ...................... G01C 21/30 |
| 2021/0072391 A1* | 3/2021 | Li ........................ G06V 10/764 |
| 2023/0186647 A1* | 6/2023 | Mahata ................. G01S 17/86 |
| | | 382/103 |
| 2024/0395050 A1* | 11/2024 | Chattopadhyay ..... G01S 17/931 |

FOREIGN PATENT DOCUMENTS

| | | |
|---|---|---|
| JP | 2020-507072 A | 3/2020 |
| JP | 2020-085523 A | 6/2020 |
| WO | 2013/076829 A1 | 5/2013 |
| WO | 2018/180338 A1 | 10/2018 |
| WO | 2018/221453 A1 | 12/2018 |

OTHER PUBLICATIONS

European Patent Office, Extended European Search Report, Application No. 21891823.3, dated Oct. 8, 2024, in 7 pages.

* cited by examiner

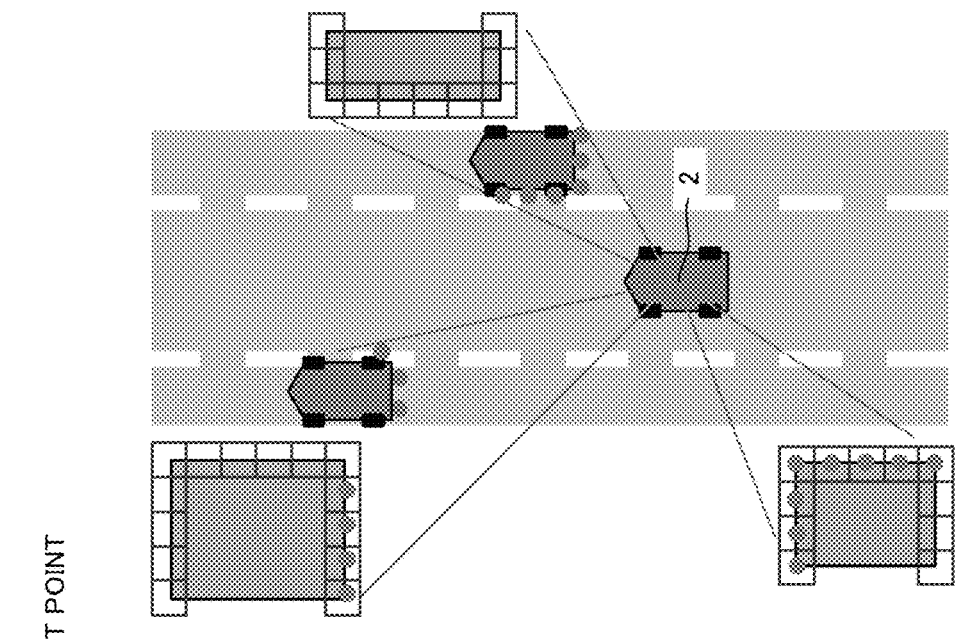
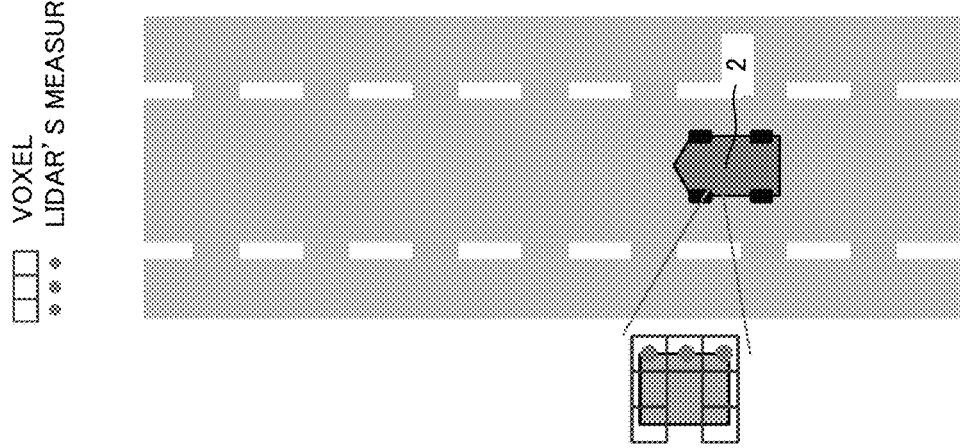
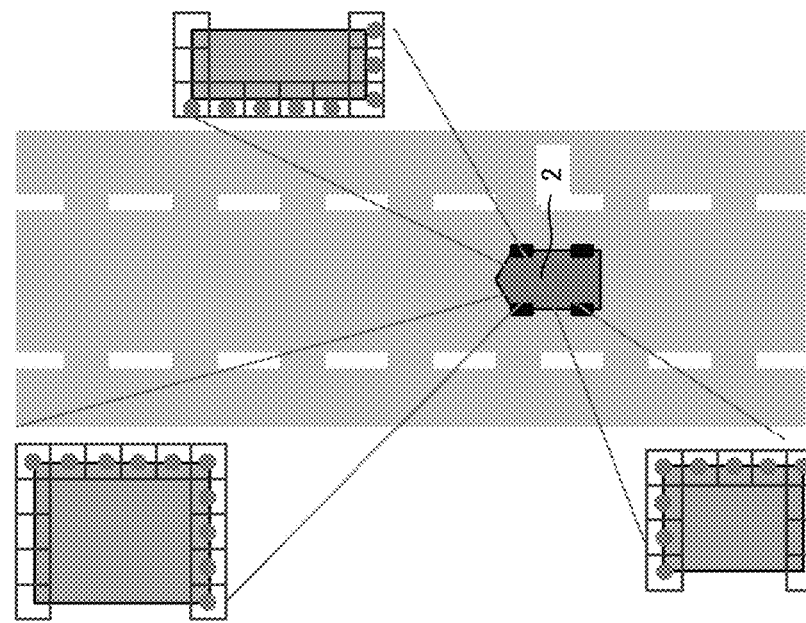
FIG. 7C
FIG. 7B
FIG. 7A

NUMBER OF MEASUREMENT POINTS
AFTER DOWN-SAMPLING

ASSOCIATED MEASUREMENT POINTS NUMBER Nc

ASSOCIATION RATE

SCORE VALUE E

PROCESSING TIME [ms]

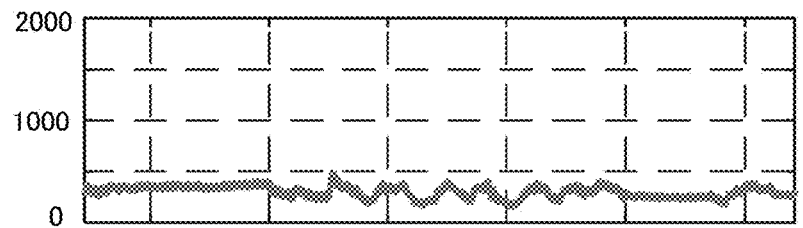
FIG. 16A  NUMBER OF MEASUREMENT POINTS AFTER DOWN-SAMPLING
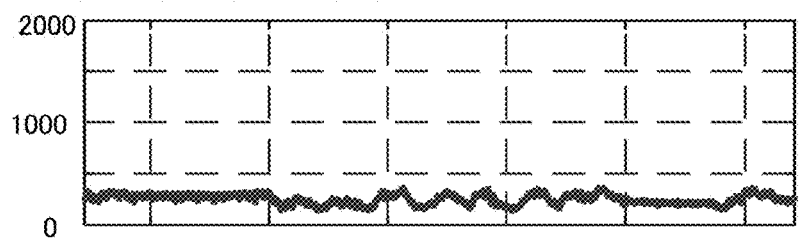
FIG. 16B  ASSOCIATED MEASUREMENT POINTS NUMBER $N_c$
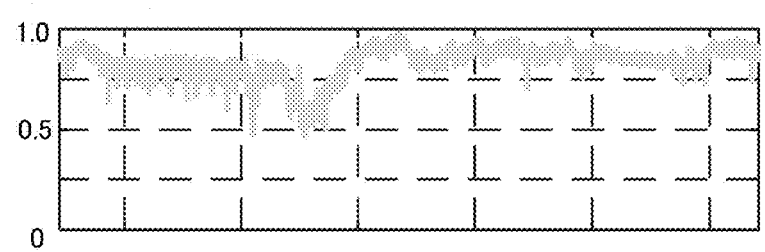
FIG. 16C  ASSOCIATION RATE
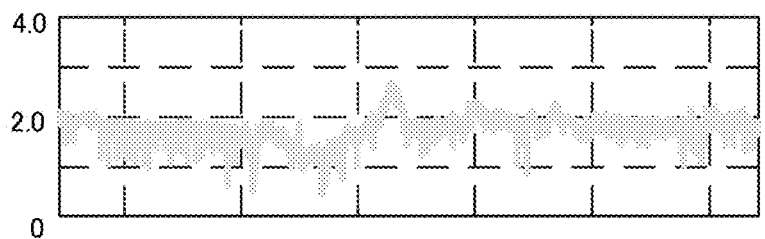
FIG. 16D  SCORE VALUE E
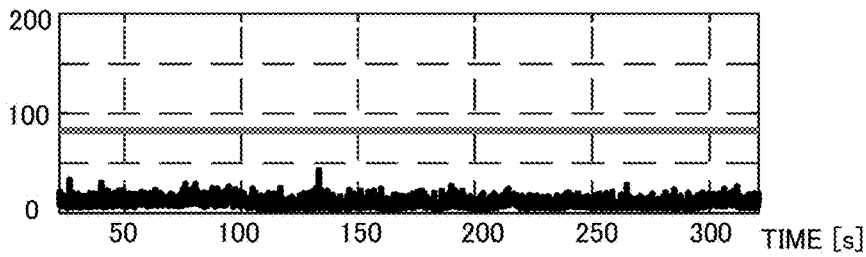
FIG. 16E  PROCESSING TIME [ms]

ERROR IN TRAVELLING DIRECTION [m]

ERROR IN LATERAL DIRECTION [m]

ERROR IN HEIGHT DIRECTION [m]

ERROR IN YAW ANGLE [deg]

NUMBER OF MEASUREMENT POINTS
BEFORE DOWN-SAMPLING

DOWN-SAMPLING SIZE [m]

TIME [s]

NUMBER OF MEASUREMENT POINTS
AFTER DOWN-SAMPLING

ASSOCIATED MEASUREMENT POINTS NUMBER Nc

ASSOCIATION RATE

SCORE VALUE E

PROCESSING TIME [ms]

FIG. 19A NUMBER OF MEASUREMENT POINTS BEFORE DOWN-SAMPLING
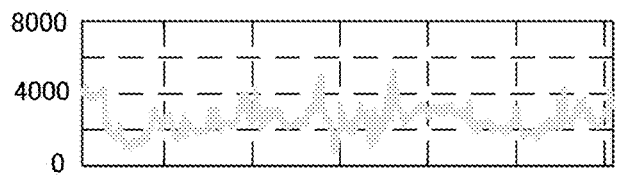
FIG. 19B DOWN-SAMPLING SIZE [m]
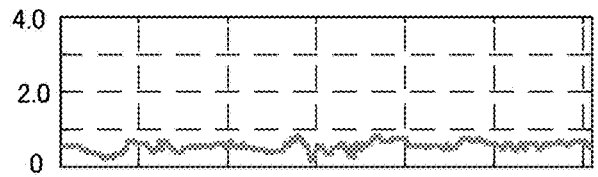
FIG. 19C NUMBER OF MEASUREMENT POINTS AFTER DOWN-SAMPLING
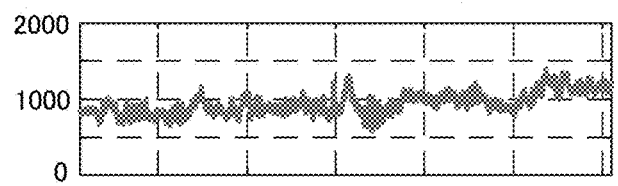
FIG. 19D ASSOCIATED MEASUREMENT POINTS NUMBER $N_c$
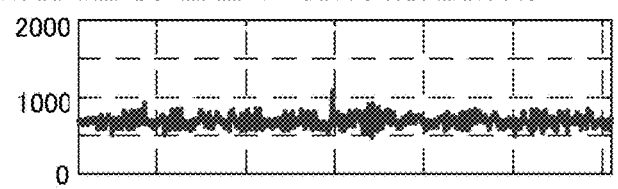
FIG. 19E ASSOCIATION RATE
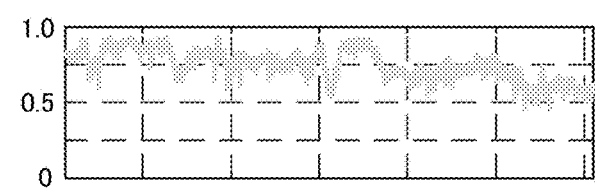
FIG. 19F SCORE VALUE E
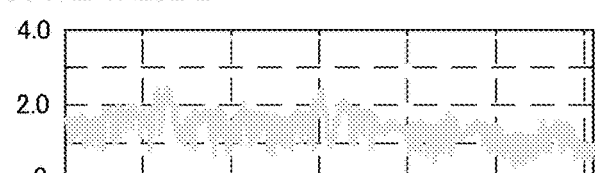
FIG. 19G PROCESSING TIME [ms]
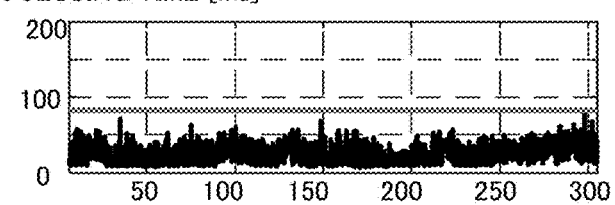
TIME [s]

NUMBER OF MEASUREMENT POINTS BEFORE DOWN-SAMPLING

DOWN-SAMPLING SIZE [m]

NUMBER OF MEASUREMENT POINTS AFTER DOWN-SAMPLING

ASSOCIATED MEASUREMENT POINTS NUMBER Nc

ASSOCIATION RATE

SCORE VALUE E

PROCESSING TIME [ms]

ERROR IN TRAVELLING DIRECTION [m]

ERROR IN LATERAL DIRECTION [m]

ERROR IN HEIGHT DIRECTION [m]

ERROR IN YAW ANGLE [deg]

NUMBER OF MEASUREMENT POINTS BEFORE DOWN-SAMPLING

DOWN-SAMPLING SIZE [m]

TIME [s]

NUMBER OF MEASUREMENT POINTS
AFTER DOWN-SAMPLING

ASSOCIATED MEASUREMENT POINTS NUMBER Nc

ASSOCIATION RATE

SCORE VALUE E

PROCESSING TIME [ms]

INFORMATION PROCESSING DEVICE, CONTROL METHOD, PROGRAM, AND STORAGE MEDIUM

CROSS-REFERENCE TO RELATED APPLICATIONS

This application is US National Stage of International Patent Application PCT/JP2021/041005, filed Nov. 8, 2021, which claims benefit of priority from Japanese Patent Application 2020-189517, filed Nov. 13, 2020, the contents of both of which are incorporated herein by reference.

TECHNICAL FIELD

The present invention relates to down-sampling of data to be used for position estimation.

BACKGROUND ART

Conventionally, there is known a technique for estimating a self position of a vehicle by matching shape data of a peripheral object measured by a measurement device such as a laser scanner with map information in which the shape of the peripheral object is stored in advance. For example, Patent Literature 1 discloses an autonomous moving system configured to determine whether a detected object is a stationary object or a moving object with respect to each voxel obtained by dividing the space, thereby to match the measurement data with map information with respect to voxels where the stationary object is present. Further, Patent Literature 2 discloses a scan matching method for performing own vehicle position estimation by matching voxel data per voxel including an average vector and a covariance matrix of a stationary object with point cloud data outputted by a lidar.

PRIOR ART DOCUMENTS

Patent Literature

Patent Literature 1: WO2013/076829
Patent Literature 2: WO2018/221453

SUMMARY

Problem to be Solved by the Invention

When own vehicle position estimation is performed by matching voxel data with point cloud data outputted by the lidar as described in Patent Literature 2, it is necessary to perform down-sampling process, which is a process of decimating point cloud data from a lidar by averaging the point cloud data with respect to each of divided spaces with a predetermined size. This down-sampling equalizes the dense in the point cloud data, which is dense in areas close to the own vehicle and sparse in distant areas, while reducing the total number of point cloud data. Thus, it improves the self position estimation accuracy while suppressing the increase in the calculation time. However, in a space where there are few objects around the own vehicle, the number of point cloud data detected by the lidar is small, and therefore the number of point cloud data to be used for the calculation could greatly be reduced by the down-sampling process. As a result, unfortunately, the accuracy and the robustness of the self position estimation could be lowered.

The present disclosure has been made in order to solve the above issues, and it is an object of the present invention to provide an information processing device suitably capable of suitably performing down-sampling.

Means for Solving the Problem

One invention is an information processing device including:
an acquisition unit configured to acquire point cloud data outputted by a measurement device;
a down-sampling processing unit configured to generate processed point cloud data obtained by down-sampling the point cloud data; and
an association unit configured to match the processed point cloud data with voxel data which represents a position of an object with respect to each voxel that is a unit area and thereby associate a measurement point of the processed point cloud data with the each voxel,
wherein the down-sampling processing unit is configured to change a size of the subsequent down-sampling based on an associated measurement points number which is the number of the measurement points associated with the each voxel.

Another invention is a control method executed by a computer, the control method including:
acquiring point cloud data outputted by a measurement device;
generating processed point cloud data obtained by down-sampling the point cloud data;
matching the processed point cloud data to voxel data which represents a position of an object with respect to each voxel that is a unit area and thereby associating a measurement point of the processed point cloud data with the each voxel; and
changing a size of the subsequent down-sampling based on an associated measurement points number which is the number of the measurement points associated with the each voxel.

Still another invention is a program executed by a calculation unit, the program causing the computer to:
acquire point cloud data outputted by a measurement device;
generate processed point cloud data obtained by down-sampling the point cloud data;
match the processed point cloud data with voxel data which represents a position of an object with respect to each voxel that is a unit area and thereby associate a measurement point of the processed point cloud data with the each voxel; and
change a size of the subsequent down-sampling based on an associated measurement points number which is the number of the measurement points associated with the each voxel.

BRIEF DESCRIPTION OF THE DRAWINGS

FIG. 7 It is a bird's-eye view of the area around the vehicle on which the device is mounted.

FIG. 16 It illustrates the results of the own vehicle position estimation by NDT process after the down-sampling using 2.0 meter cubic grids.

FIG. 19 It illustrates the results of down-sampling and the own vehicle position estimation by NDP process performed according to the procedure shown in FIG. 12 in the event of occlusion (shielding) by other vehicle(s).

DETAILED DESCRIPTION OF PREFERRED EMBODIMENTS

Figure 1:
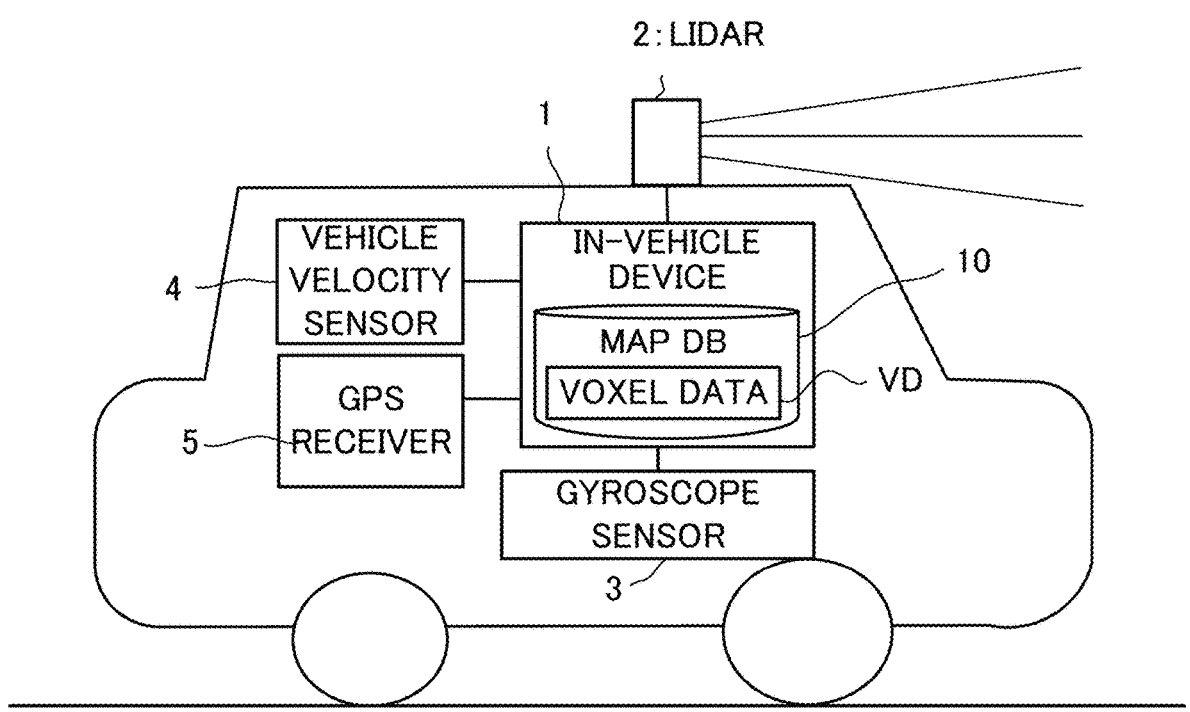
FIG. 1 It is a schematic configuration diagram of a driving support system.

According to a preferred embodiment of the present invention, the information processing device includes: an acquisition unit configured to acquire point cloud data outputted by a measurement device; a down-sampling processing unit configured to generate processed point cloud data obtained by down-sampling the point cloud data; and an association unit configured to match the processed point cloud data with voxel data which represents a position of an object with respect to each voxel that is a unit area and thereby associate a measurement point of the processed point cloud data with the each voxel, wherein the down-sampling processing unit is configured to change a size of the subsequent down-sampling based on an associated measurement points number which is the number of the measurement points associated with the each voxel. According to this embodiment, the information processing device adaptively changes the size of the down-sampling on the basis of the associated measurement points number which is the number of measurement points of the processed point cloud data associated with voxels having corresponding voxel data, thereby suitably optimizing the associated measurement points number.

In one mode of the information processing device, the down-sampling processing unit is configured to fix the size in a first direction selected from directions along which a space is divided in the down-sampling while changing the size in a direction other than the first direction based on the associated measurement points number. In some embodiments, the first direction is a traveling direction of the measurement device. According to this mode, the information processing device can suitably ensure the resolution by fixing the size of the down-sampling in the direction where the resolution of the processed point cloud data is required.

In another mode of the information processing device, the down-sampling processing unit is configured to change the size based on a comparison between the associated measurement points number and a target range of the associated measurement points number. With this mode, the information processing device can accurately change the size of the down-sampling.

In still another mode of the information processing device, the down-sampling processing unit is configured to increase the size by a predetermined ratio or a predetermined value if the associated measurement points number is larger than an upper limit of the target range, decrease the size by a predetermined ratio or a predetermined value if the associated measurement points number is smaller than a lower limit of the target range, and maintain the size if the associated measurement points number is within the target range. According to this mode, the information processing device can accurately change the size of the down-sampling so that the associated measurement points number is maintained within the target range.

In still another mode of the information processing device, the down-sampling processing unit is configured to determine a reference size of the subsequent down-sampling based on the associated measurement points number, and determine, based on the reference size and a ratio set for each direction along which a space is divided in the down-sampling, the size for the each direction. With this mode, the information processing device can suitably determine the size of the down-sampling for each direction by using the ratio depending on the accuracy and the degree of importance or the like for each direction.

In another mode of the information processing device, the information processing device further includes a position estimation unit configured to estimate a position of a moving object equipped with the measurement device based on a matching result between voxel data of the each voxel associated by the association unit and the measurement point associated with the each voxel. In this mode, the information processing device can suitably meet both accuracy requirement and processing time requirement of the position estimation by performing the position estimation using the processed point cloud data generated by adaptively changing the size of the down-sampling.

In still another mode of the information processing device, the down-sampling processing unit is configured to change the size based on a processing time in the down-sampling processing unit and the position estimation unit. In some embodiments, the down-sampling processing unit is configured to change the size based on a comparison between the processing time and a target range of the processing time. According to this mode, the information processing device can suitably set the size of the down-sampling such that the processing time in the down-sampling processing unit and the position estimation unit is appropriate.

According to another preferred embodiment of the present invention, there is provided a control method executed by a computer, the control method including: acquiring point cloud data outputted by a measurement device; generating processed point cloud data obtained by down-sampling the point cloud data; matching the processed point cloud data to voxel data which represents a position of an object with respect to each voxel that is a unit area and thereby associating a measurement point of the processed point cloud data with the each voxel; and changing a size of the subsequent down-sampling based on an associated measurement points number which is the number of the measurement points associated with the each voxel. By executing this control method, the information processing device can adaptively change the size of the down-sampling on the basis of the associated measurement points number thereby to suitably optimize the associated measurement points number.

According to still another preferred embodiment of the present invention, there is provided a program executed by a computer, the program causing the computer to: acquire point cloud data outputted by a measurement device; generate processed point cloud data obtained by down-sampling the point cloud data; match the processed point cloud data with voxel data which represents a position of an object with respect to each voxel that is a unit area and thereby associate a measurement point of the processed point cloud data with the each voxel; and change a size of the subsequent down-sampling based on an associated measurement points number which is the number of the measurement points associated with the each voxel. By executing this program, the computer can adaptively change the size of the down-sampling on the basis of the associated measurement points number thereby to suitably optimize the associated measurement points number. In some embodiments, the program is stored in a storage medium.

EMBODIMENTS

Hereinafter, preferred embodiments of the present invention are described below with reference to drawings. Hereinafter, preferred embodiments of the present invention are described below with reference to drawings. It is noted that a character with "^" or "–" on its top is expressed in this specification as "A^" or "A¯" (where "A" is a character) for convenience.

(1) Overview of Driving Support System

FIG. 1 is a schematic configuration of a driving support system according to the present embodiment. The driving support system includes an in-vehicle device 1 that moves together with a vehicle that is a moving body, a lidar (Lidar: Light Detection and Ranging, or Laser Illuminated Detection And Ranging) 2, a gyroscope sensor 3, a vehicle velocity sensor 4, and a GPS receiver 5.

The in-vehicle device 1 is electrically connected to the lidar 2, the gyroscope sensor 3, the vehicle velocity sensor 4, and the GPS receiver 5, and estimates the position (also referred to as "own vehicle position") of the vehicle in which the in-vehicle device 1 is provided on the basis of the output signals thereof. Then, the in-vehicle device 1 performs autonomous driving control of the vehicle or the like so as to travel along the route to the set destination based on the estimation result of the own vehicle position. The in-vehicle device 1 stores a map database (DB: DataBase) including voxel data "VD". The voxel data VD is data per voxel which includes position data of stationary structure object(s), wherein a voxel is a cube (regular grid) which becomes the smallest unit in the three-dimensional space. The voxel data VD contains the data representing the measured point cloud data of stationary structure object(s) in the voxel of interest by normal distribution. As will be described later, the voxel data VD is used for scan matching based on NDT (Normal Distributions Transform). The in-vehicle device 1 estimates at least the yaw angle and the position of the vehicle on the plane by NDT scanning matching. The in-vehicle device 1 may further perform the estimation of the height position, the pitch angle and the roll angle of the vehicle. Unless otherwise noted, the term "own vehicle position" shall also include angle(s) of the posture such as the yaw angle of the vehicle to be estimated.

The lidar 2 emits pulse lasers with respect to a predetermined angular range in the horizontal and vertical directions to thereby discretely measure the distance to object(s) existing in the outside and generate three dimensional point cloud data indicating the position of the objects. In this case, the lidar 2 includes a radiation unit configured to radiate a laser beam while changing the irradiation direction, a light receiving unit configured to receive the reflected light (scattered light) of the irradiated laser beam, and an output unit configured to output scan data (which is data of a point constituting the point cloud data and which is hereinafter referred to as "measurement point") generated based on the light signal received by the light receiving unit. The measurement point is generated based on the irradiation direction corresponding to the laser beam received by the light receiving unit and the response delay time of the laser beam to be identified based on the received light signal described above. In general, the closer the distance to the object is, the higher the accuracy of the distance measurement value outputted by the lidar becomes whereas the farther the distance is, the lower the accuracy becomes. The lidar 2, the gyroscope sensor 3, the vehicle velocity sensor 4, and the GPS receiver 5 respectively provide the output data to the in-vehicle device 1.

The in-vehicle device 1 is an example of the "information processing device" in the present invention, and the lidar 2 is an example of the "measurement device" in the present invention. It is noted that the driving support system may include an inertial measurement device (IMU) for measuring the acceleration and angular velocities of the vehicle in three axial directions in place of or in addition to the gyroscope sensor 3.

(2) Configuration of In-Vehicle Device

Figure 2:
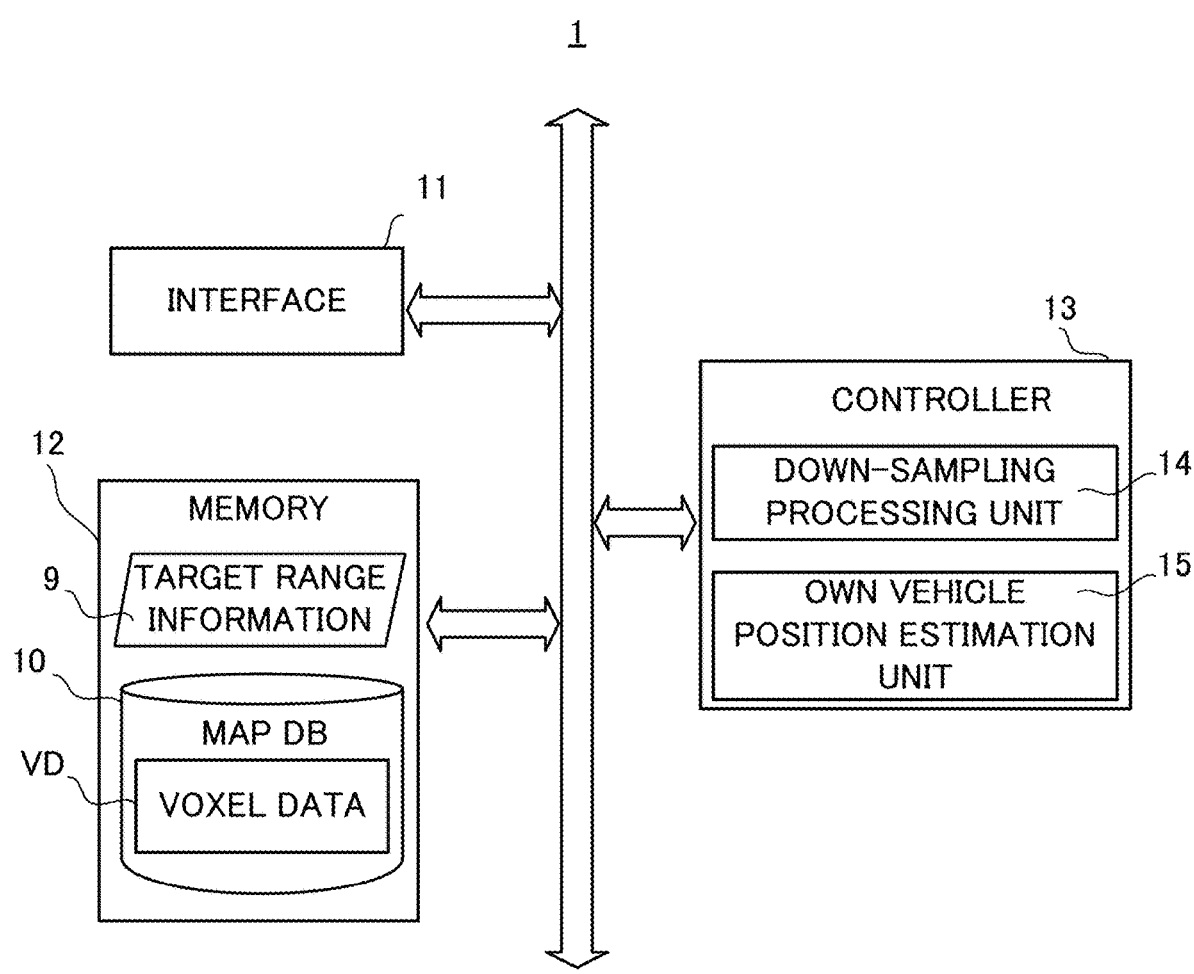
FIG. 2 It is a block diagram showing a functional configuration of an in-vehicle device.

FIG. 2 is a block diagram showing an example of a hardware configuration of the in-vehicle device 1. The in-vehicle device 1 mainly includes an interface 11, a memory 12, and a controller 13. Each of these elements is connected to one another through a bus line.

The interface 11 performs an interface operation related to data exchange between the in-vehicle device 1 and an external device. In the present exemplary embodiment, the interface 11 acquires output data from sensors such as the lidar 2, the gyroscope sensor 3, the vehicle velocity sensor 4, and the GPS receiver 5 and supplies the output data to the controller 13. The interface 11 also provides signals relating to the travelling control of the vehicle generated by the controller 13 to an electronic control unit (ECU: Electronic Control Unit) of the vehicle. The interface 11 may be a wireless interface, such as a network adapter, for performing wireless communication, or a hardware interface, such as a cable, for connecting to an external device. The interface 11 may perform interface operation with various peripheral devices such as an input device, a display device, a sound output device, and the like.

The memory 12 is configured by various volatile and non-volatile memories such as a RAM (Random Access Memory), a ROM (Read Only Memory), a hard disk drive, a flash memory, and the like. The memory 12 stores a program for the controller 13 to perform a predetermined process. The program to be executed by the controller 13 may be stored in a storage medium other than the memory 12.

The memory 12 also stores target range information 9 and the map DB 10 including the voxel data VD.

The target range information 9 is information to be used for setting the size of the down-sampling in the case of performing down-sampling of the point cloud data obtained per one cycle period of the scanning by the lidar 2. Specifically, the target range information 9 represents the target range of the number of measurement points (also referred to as "associated measurement points number Nc") that are the point cloud data after the down-sampling and which are associated with the voxel data VD in the NDT matching performed at every clock time that is determined based on the scan cycle of the lidar 2. Hereafter, the target range of the associated measurement points number Nc indicated by the target range information 9 is also referred to as "target range $R_{Nc}$".

At least one of the target range information 9 or the map DB 10 may be stored in a storage device external to the in-vehicle device 1 such as a hard disk connected to the in-vehicle device 1 via the interface 11. The above-described storage device may be a server device that communicates with the in-vehicle device 1. Further, the storage device may be configured by a plurality of devices. The map DB 10 may also be updated periodically. In this case, for example, the controller 13 receives partial map information about the area to which the vehicle position belongs from the server device that manages the map information via the interface 11, and reflects it in the map DB 10.

The controller 13 includes one or more processors, such as a CPU (Central Processing Unit), GPU (Graphics Processing Unit), and TPU (Tensor Processing Unit), and controls the entire in-vehicle device 1. In this case, the controller 13 performs processing related to the own vehicle position estimation by executing a program stored in the memory 12 or the like.

The controller 13 functionally includes a down sampling processing unit 14 and an own vehicle position estimation unit 15. The controller 13 functions as an "acquisition unit", "down sampling processing unit", "association unit", and a computer configured to execute the program.

The down sampling processing unit 14 performs down-sampling of the point cloud data outputted from the lidar 2 to thereby generate point cloud data (also referred to as "processed point cloud data") adjusted to reduce the number of measurement points. In this down-sampling, the down-sampling processing unit 14 averages the point cloud data per unit space with a size to thereby generate the processed point cloud data corresponding to the reduced number of measurement points. In this instance, the down-sampling processing unit 14 adaptively sets the above-described size to be used in the down-sampling so that the associated measurement points number Nc in the NDT matching at every clock time is within the target range $R_{Nc}$.

The own vehicle position estimation unit 15 estimates the own vehicle position by performing scan matching (NDT scan matching) based on NDT on the basis of the processed point cloud data generated by the down-sampling process unit 14 and the voxel data VD corresponding to the voxels to which the point cloud data belongs.

(3) Setting of Down-Sampling Size

Next, details of the process to be executed by the down-sampling processing unit 14 will be described. Schematically, at each clock time, the down-sampling processing unit 14 compares the associated measurement points number Nc with the target range $R_{Nc}$ indicated by the target range information 9 after the down-sampling, and sets the size of the down-sampling at the following clock time according to the comparison result. Thereby, the down-sampling processing unit 14 adaptively determines the size of the down-sampling so that the associated measurement points number Nc is maintained within the target range $R_{Nc}$.

Figure 3:
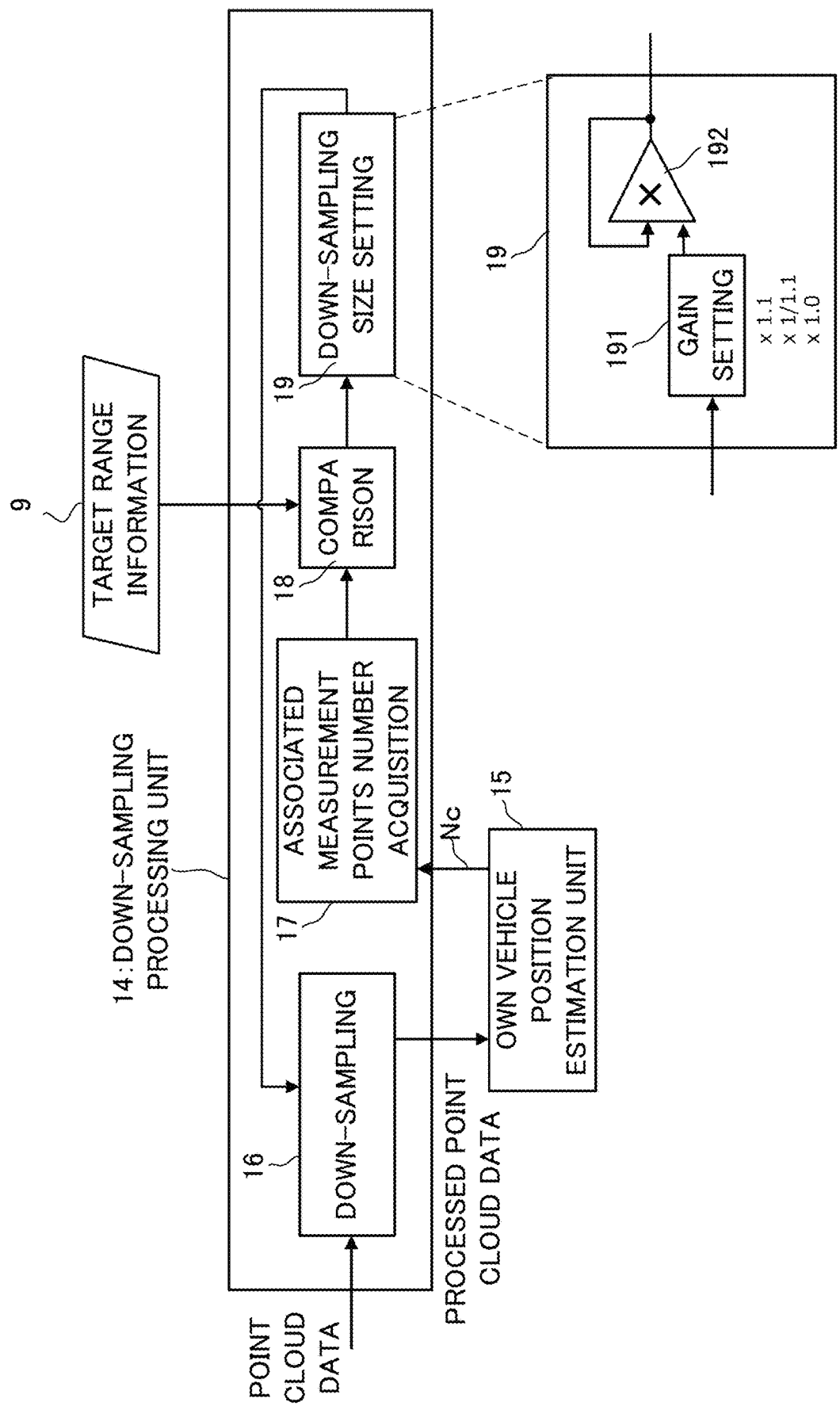
FIG. 3 It illustrates an example of a functional block of a down-sampling processing unit 14.

FIG. 3 shows an example of the functional blocks of the down-sampling processing unit 14. The down-sampling processing unit 14 functionally includes a down-sampling block 16, an associated measurement points number acquisition block 17, a comparison block 18, and a down-sampling size setting block 19. In FIG. 3, blocks to exchange data with each other are connected by solid line, but the combination of the blocks to exchange data with each other is not limited to the combination shown in FIG. 3. It is true for the drawings of other functional blocks described below.

The down-sampling block 16 performs down-sampling of the point cloud data for one cycle period of scanning generated at each clock time by the lidar to thereby generate processed point cloud data at each clock time. In this case, the down-sampling block 16 divides the space into grids based on the set size of the down-sampling and calculates the representative point of the measurement points of the point cloud data included in each of the grids. In this case, for example, the space to be divided is a space in the three-dimensional coordinate system whose axes are along the traveling direction, the height direction, and the lateral direction (i.e., the direction perpendicular to the traveling direction and the height direction) of the in-vehicle device 1, respectively. The grids are formed by dividing the space along each of these directions. The size of the down-sampling is a default size stored in the memory 12 or a size set immediately before by the down-sampling size setting block 19. The down-sampling block 16 supplies the generated processed point cloud data to the own vehicle position estimation unit 15.

It is noted that the size of the down-sampling may vary among the traveling direction, the height direction, and the lateral direction of the in-vehicle device 1. Any voxel grid filter method may also be used for the down-sampling block 16.

The associated measurement points number acquisition block 17 acquires the associated measurement points number Nc from the own vehicle position estimation unit 15. In this instance, for each clock time, the own vehicle position estimation unit 15 performs NDT matching of the processed point cloud data supplied from the down-sampling block 16 and outputs the associated measurement points number Nc for each clock time to the associated measurement points number acquisition block 17. The associated measurement points acquisition block 17 supplies the associated measurement points number Nc to the comparison block 18.

The comparison block 18 compares the magnitude between the target range $R_{Nc}$ indicated by the target range information 9 and the associated measurement points number Nc at each clock time, and supplies the comparison result to the down-sampling size setting block 19. In this case, for example, the comparison block 18 determines the comparison result which falls under one of the following cases:

The associated measurement points number Nc is larger than the upper limit of the target range $R_{Nc}$;

The associated measurement points number Nc is within the target range $R_{Nc}$; or The associated measurement points number Nc is smaller than the lower limit of the target range $R_{Nc}$.

Then, the comparison block 18 supplies the determination result to the down-sampling size setting block 19. For example, when the target range $R_{Nc}$ indicates the range from 600 to 800, the comparison block 18 makes the above-described determination by using the upper limit of the target range $R_{Nc}$ set to 800 and the lower limit of the target range $R_{Nc}$ set to 600. The target range $R_{Nc}$ is not limited to the range from 600 to 800, but is determined according to the hardware to be used, the performance of the processor, and the time required to be completed (i.e., the time interval between the successive clock times).

The down-sampling size setting block 19 sets the size of the down-sampling to be applied at the subsequent clock time based on the comparison result of the comparison block 18. In this case, the down sampling size setting block 19 increases the size of the down sampling when the associated measurement points number Nc is greater than the upper limit of the target range $R_{Nc}$, and decreases the size of the down sampling when the associated measurement points number Nc is less than the lower limit of the target range $R_{Nc}$. On the other hand, the down sampling size setting block 19 maintains (i.e., does not change) the size of the down sampling when the associated measurement points number Nc is within the target range $R_{Nc}$.

FIG. 3 also illustrates a specific embodiment of a down-sampling size setting block 19 having a gain setting sub-block 191 and a multiplication sub-block 192.

The gain setting sub-block 191 sets the gain for the multiplication sub-block 192 to multiply the size of the current size of the down-sampling by, based on the comparison result in the comparison block 18. In this case, the gain setting sub-block 191 sets the gain to be greater than 1 when the associated measurement points number Nc is greater than the upper limit of the target range $R_{Nc}$, and sets the gain to be less than 1 when the associated measurement points number Nc is less than the lower limit of the target range $R_{Nc}$, and sets the gain to 1 when the associated measurement points number Nc is within the target range $R_{Nc}$. In FIG. 3, the gain is set as follows as an example.

The associated measurement points number Nc is larger than the upper limit of the target area $R_{Nc}$ ⇒Gain "1.1", The associated measurement points number Nc is smaller than the lower limit of the target area $R_{Nc}$ ⇒Gain "1/1.1", The associated measurement points number Nc is within the target range $R_{Nc}$ ⇒Gain "1.0"

The multiplication sub-block 192 outputs, as the size of the down-sampling to be used for the subsequent clock time, the value obtained by multiplying the current size of the down-sampling by the gain set by the gain setting sub-block 191.

According to such a configuration, when the associated measurement points number Nc is larger than the upper limit of the target area $R_{Nc}$, the down-sampling size setting block 19 can increase the size of the down-sampling to change the size of the down-sampling such that the number of measurement points of the processed point cloud data is easily reduced. Similarly, when the associated measurement points number Nc is less than the lower limit of the target range $R_{Nc}$, the down-sampling size setting block 19 can decrease the size of the down-sampling to change the size of the down sampling such that the number of measurement points of the processed point cloud data is easily increased.

It is noted that the respective values of the gain to be set in the gain setting sub-block 191 are examples, and are set to appropriate numerical values based on the experimental result or the like. Further, the down-sampling size setting block 19 may perform addition or subtraction of a predetermined value instead of multiplying by the gain. In this case, when the associated measurement points number Nc is greater than the upper limit of the target range $R_{Nc}$, the down-sampling size setting block 19 raises the size of the down-sampling by a predetermined value that is a positive number. In contrast, when the associated measurement points number Nc is less than the lower limit of the target range $R_{Nc}$, the down-sampling size setting block 19 lowers the size of the down-sampling by a predetermined value that is a positive number. The above gain and the predetermined value may be set to vary depending on the direction (the traveling direction, the lateral direction, the height direction).

Here, the adequacy of the configuration of the down-sampling processing unit 14 shown in FIG. 3 will be supplementarily described.

In general, while there is such a relation the number of data (i.e., the number of measurement points of the processed point cloud data) decreases with increasing size of the down-sampling, the relation between the size of the down-sampling and the number of data is not linear. Therefore, it is not appropriate to determine the size of down-sampling by linear feedback control. In view of the above, in this example, the down-sampling process unit 14 is configured so that the dead band is provided by using the target range $R_{Nc}$ which is a target range of the associated measurement points number Nc and so that the associated measurement points number Nc gradually reaches the target level by using constant gains regardless of the difference between the number of data and the target range $R_{Nc}$.

Next, a specific example of down-sampling will be described. In the following explanation, for the sake of simplicity of explanation, the voxel data VD corresponding to four voxels and the point cloud data belonging to the voxels will be used.

Figure 4A:
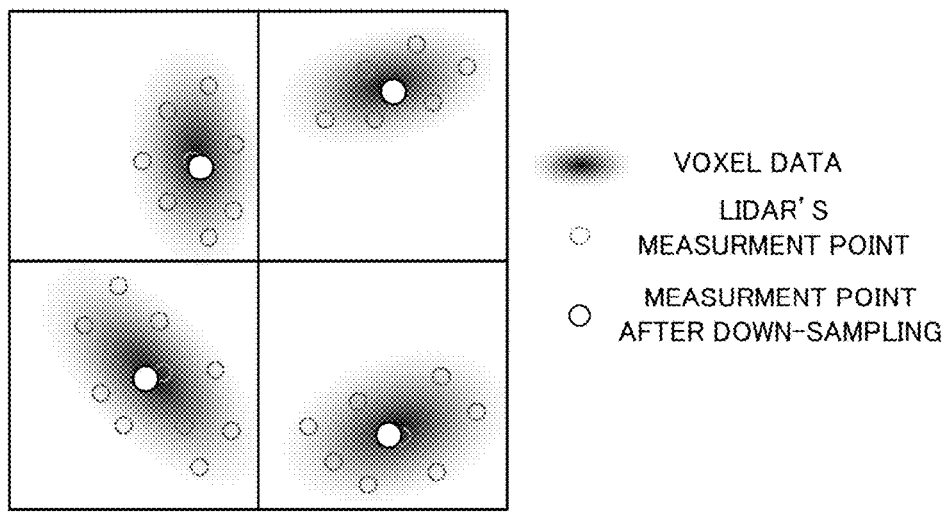
FIG. 4 It is a diagram showing first execution results of performing down-sampling using different down-sampling sizes.
Figure 4B:
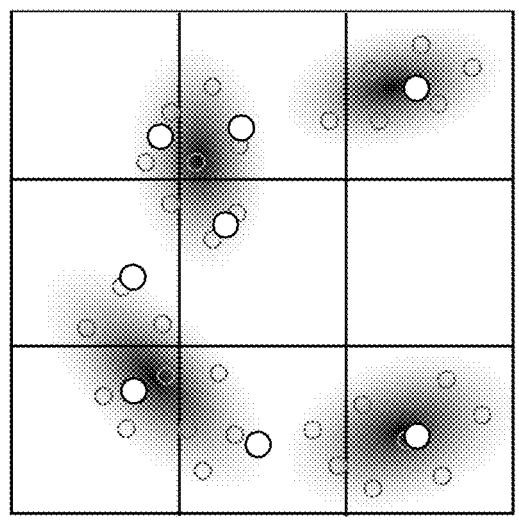
Figure 4C:
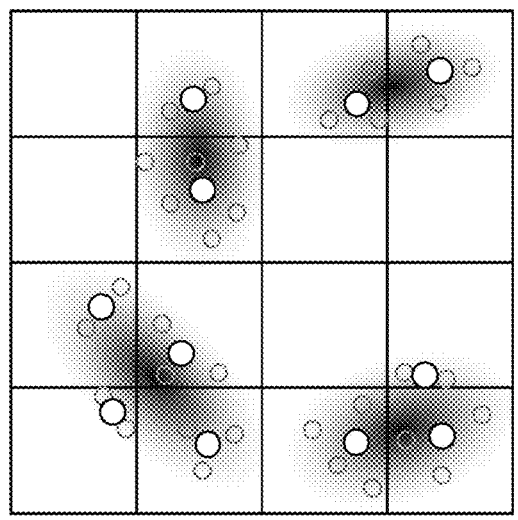

FIGS. 4A to 4C are diagrams illustrating the first execution results in which the down-sampling is performed according to different sizes of the down-sampling, respectively. The size of the down-sampling in FIG. 4A is set to be equal to the voxel size, the size of the down-sampling in FIG. 4B is set to be two thirds of the voxel size, and the size of the down-sampling in FIG. 4C is set to be half of the voxel size. In FIG. 4A to FIG. 4C, the voxel data VD expressed by the normal distribution, the point cloud data before the down-sampling, and the processed point cloud data after the down-sampling are shown.

The down-sampling block 16 generates grids obtained by partitioning the space corresponding to the four voxels of interest by each size of the down-sampling set for each case of FIG. 4A to FIG. 4C. Then, the down-sampling block 16 calculates the average of the positions indicated by each measurement point of the lidar 2 with respect to each grid, and generates the calculated average position as a measurement point of the processed point cloud data corresponding to the each grid.

Here, a description will be given of such a case that the target of the number (i.e., the associated measurement points number Nc) of measurement points after the down-sampling is four, i.e., the case that the target of the number for achieving both to obtain a sufficient position estimation accuracy and to suppress the calculation time within a predetermined time is assumed to be four. In the examples of FIGS. 4A to 4C, the measurement points before down-sampling are relatively dense. Therefore, in the examples of FIG. 4B and FIG. 4C in which the size of the down-sampling is relatively small, the number of measurement points after down-sampling becomes excessive. That leads to increase in the matching calculation load, and therefore there is a possibility that calculation is not completed within a predetermined processing duration. On the other hand, in the example of FIG. 4A in which the size of the down-sampling is the largest, the number of measurement points after down-sampling is four. Therefore, in the examples of FIG. 4A to FIG. 4C, by making the size of the down-sampling equal to the voxel size, the number of measurement points after down-sampling can be optimized.

Figure 5A:
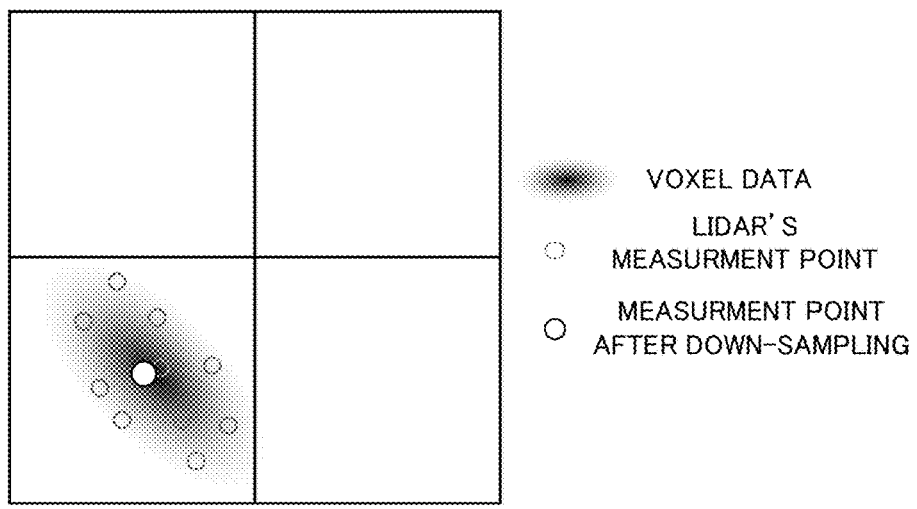
FIG. 5 It is a diagram showing second execution results of performing down-sampling using different down-sampling sizes.
Figure 5B:
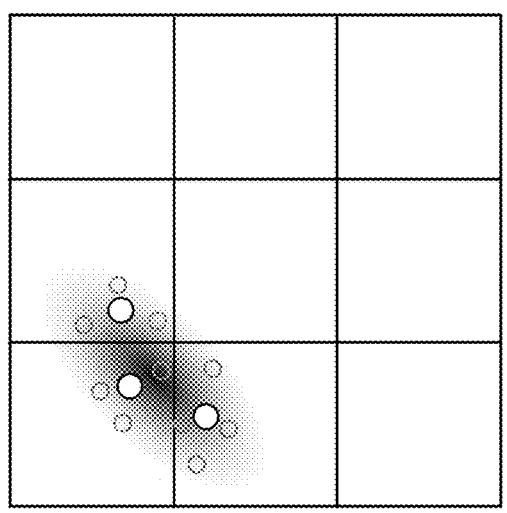
Figure 5C:
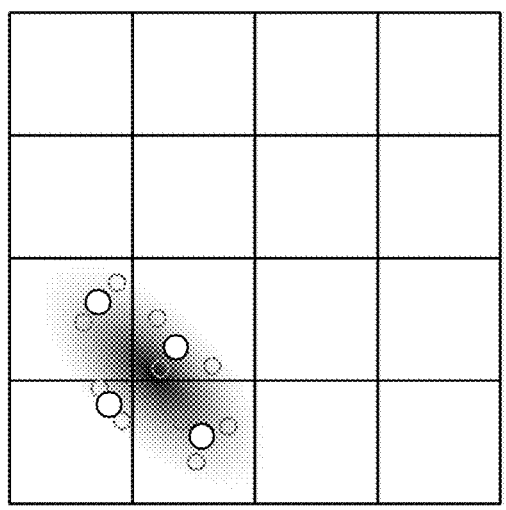

FIGS. 5A to 5C are diagrams illustrating the second execution results in which down-sampling is performed with different sizes of down-sampling, respectively. The size of the down-sampling in FIG. 5A is set to be equal to the voxel size, the size of the down-sampling in FIG. 5B is set to be two thirds of the voxel size, and the size of the down-sampling in FIG. 5C is set to be half of the voxel size. Then, it is herein described that the target of the number (i.e., the associated measurement points number Nc) of measurement points after down-sampling is four.

In this case, the voxel data and the measurement points before the down-sampling are relatively sparse, respectively. Therefore, in the examples of FIGS. 5A and 5B in which the down-sampling size is relatively large, the number of measurement points after down-sampling is insufficient. That is, there is a possibility that the position estimation accuracy deteriorates because there are few objects to be matched. In particular, in the case of FIG. 5A, it can be seen that the matching between the voxel data and the measurement points with respect to the rotational direction cannot be determined. On the other hand, in the example of FIG. 5C in which the size of the down-sampling is the smallest, the number of measurement points after down-sampling is four.

Even if there is only one voxel data, it is possible to perform the matching because the voxel data is surrounded by four measurement points. Therefore, in the examples of FIG. 5A to FIG. 5C, by setting the size of down-sampling to ½ of the voxel size, the number of measurement points after down-sampling can be optimized.

Figure 6A:
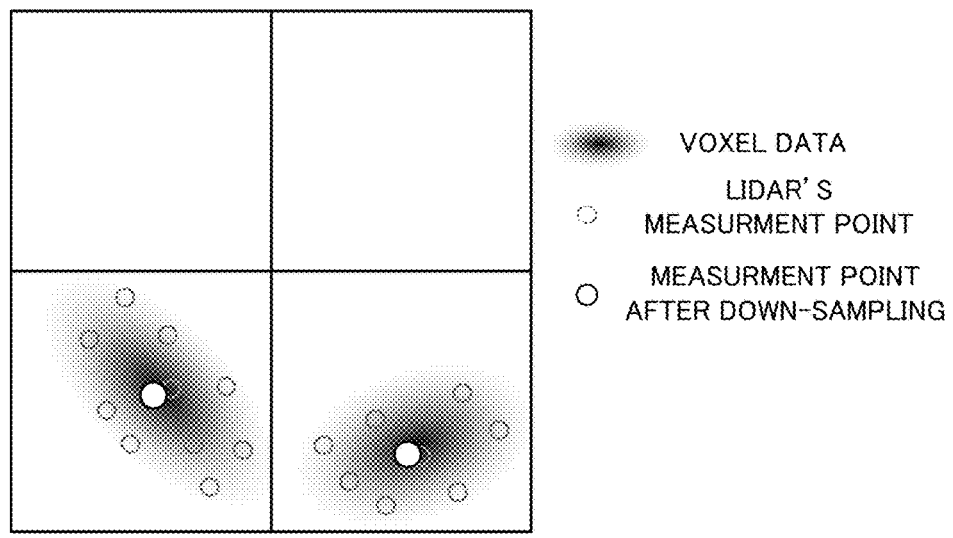
FIG. 6 It is a diagram showing third execution results of performing down-sampling using different down-sampling sizes.
Figure 6B:
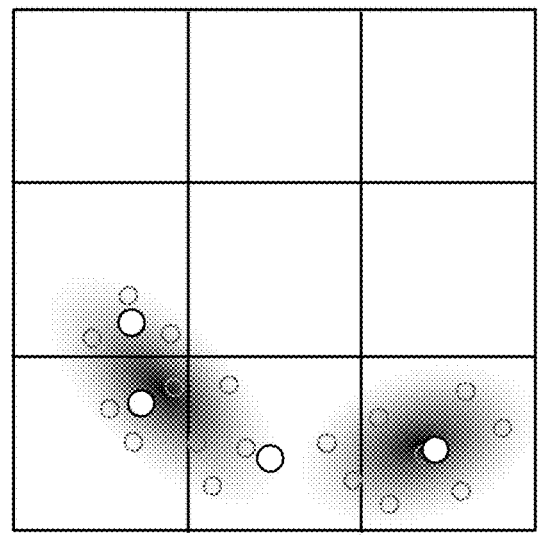
Figure 6C:
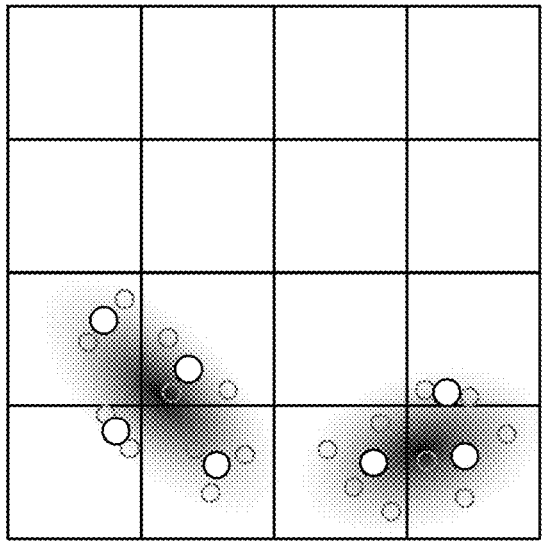

FIGS. 6A to 6C are diagrams illustrating the third execution results in which down-sampling is performed with different sizes of down-sampling, respectively. The size of the down-sampling in FIG. 6A is set to be equal to the voxel size, the size of the down-sampling in FIG. 6B is set to be two thirds of the voxel size, and the size of the down-sampling in FIG. 6C is set to be half of the voxel size. Then, a description will be given of the case where the target of the number (i.e., the associated measurement points number Nc) of measurement points after down-sampling is four.

In this case, in the example of FIG. 6A in which the size of down-sampling is the largest, the number of measurement points after down-sampling becomes too small, and in the example of FIG. 6C in which the size of down-sampling is the smallest, the number of measurement points after down-sampling becomes too large. On the other hand, in the example of FIG. 6B in which the size of the down-sampling is intermediate, the number of measurement points after down-sampling is four. Therefore, in the examples of FIG. 6A to FIG. 6C, by setting the size of the down-sampling to ⅔ of the voxel size, the number of measurement points after down-sampling can be optimized.

Thus, the appropriate size of the down-sampling differs depending on the point cloud data obtained. In view of the above, in the present embodiment, the size of down-sampling is adaptively changed, so that the associated measurement points number Nc is maintained within the target range $R_{Nc}$, the calculation time is suppressed within a required predetermined time, and the accuracy of the own vehicle position estimation is maintained.

Here, the effect of adaptively changing the size of down-sampling will be described with reference to FIGS. 7A to 7C.

FIG. 7A to FIG. 7C show a bird's-eye view of the area around the vehicle on which the in-vehicle device 1 is mounted when the down-sampling size is set to be equal to the voxel size. In FIG. 7A to FIG. 7C, each voxel in which the corresponding voxel data VD exists is indicated by a rectangular frame, and the position of each measurement point of the obtained by the lidar 2 scanning for one cycle period are indicated by a dot. Here, FIG. 7A shows an example in which there are many structures around the lidar 2, FIG. 7B shows an example in which there are few structures around the lidar 2, and FIG. 7C shows an example in which such a phenomenon (referred to as "occlusion") that the lidar's light beam is blocked by other vehicles near the own vehicle occurs. In addition, there is corresponding voxel data VD in a voxel corresponding to the surface position of the structure.

As illustrated in FIGS. 7A to 7C, the number of measurement points of the point cloud data acquired by the lidar 2 depends on not only the measurement distance and the viewing angle of the lidar 2 but also the environment around the own vehicle. For example, the number of measurement points of the point cloud data is large in the case of the dense space (see FIG. 7A) in the surroundings whereas the number of measurement points of the point cloud data is small in the case of the sparse space (see FIG. 7B) in the surroundings. In addition, when any occlusion by other vehicles or the like occurs (see FIG. 7C), the associated measurement points number Nc available for NDT scan matching is reduced.

Then, in the example of FIG. 7A, the position estimation accuracy by NDT scan matching is increased because the corresponding measurement points Nc available for NDT scan matching is enough. However, in the example of FIG. 7B and FIG. 7C, the position estimation accuracy by NDT scan matching is lowered because the corresponding measurement points Nc is small. Therefore, the size of the down-sampling must be reduced to increase the corresponding measurement points Nc. If the number of peripheral structures is larger than in FIG. 7A, there is a possibility the calculation is not completed within the required time because of the large corresponding measurement points Nc. In that case, it is necessary to set the size of the down-sampling larger.

Taking the above into consideration, the in-vehicle device 1 according to this example adjusts the associated measurement points number Nc to be maintained within the target range $R_{Nc}$ by adaptively changing the size of the down-sampling even when the environment around the own vehicle varies. Thus, the position estimation accuracy by NDT scan matching can be suitably maintained.

(4) Position Estimation Based on NDT Scan Matching

Next, the position estimation based on NDT scan matching executed by the own vehicle position estimation unit 15 will be described.

Figure 8:
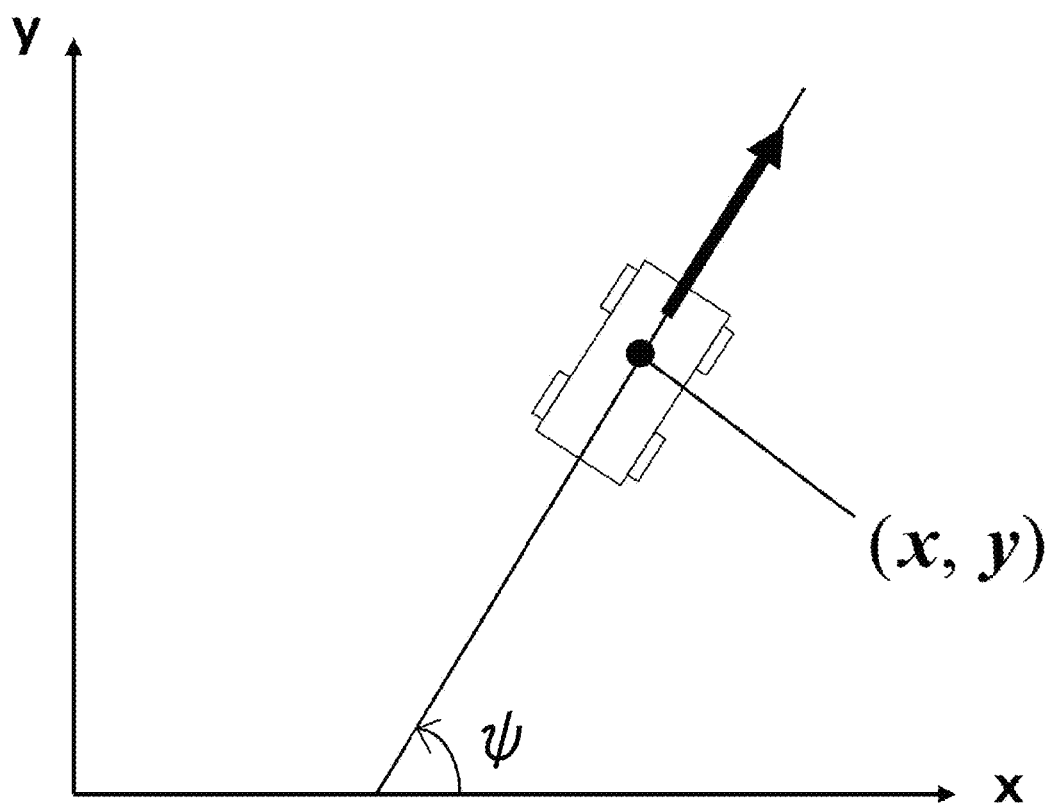
FIG. 8 It is a diagram showing the position of the vehicle to be estimated by the vehicle position estimation unit in two-dimensional Cartesian coordinates.

FIG. 8 is a diagram illustrating a position of a vehicle to be estimated by the vehicle position estimation unit 15 in the two-dimensional Cartesian coordinates. As shown in FIG. 8, the own vehicle position in the plane defined on the two-dimensional x-y Cartesian coordinates is expressed by the coordinates "(x, y)" and the azimuth (yaw angle) "iv" of the own vehicle. Here, the yaw angle ψ is defined as the angle formed between the traveling direction of the vehicle and the x-axis. The coordinates (x, y) indicate, for example, an absolute position corresponding to a combination of latitude and longitude, or world coordinates indicating a position with a predetermined point as the origin. Then, the own-vehicle position estimation unit 15 performs the own vehicle position estimation in which these x, y, and ψ are set as the estimation parameters.

In addition to x, y, and ψ, the own-vehicle position estimation unit 15 may further perform the own-vehicle position estimation in which at least one of the height position, the pitch angle, and the roll angle of the vehicle in the three-dimensional Cartesian coordinate system is estimated as the estimation parameter.

Next, voxel data VD to be used for NDT scan matching will be described. The voxel data VD contains data which represents by normal distribution the measured point cloud data of stationary structure(s) with respect to each voxel.

Figure 9:
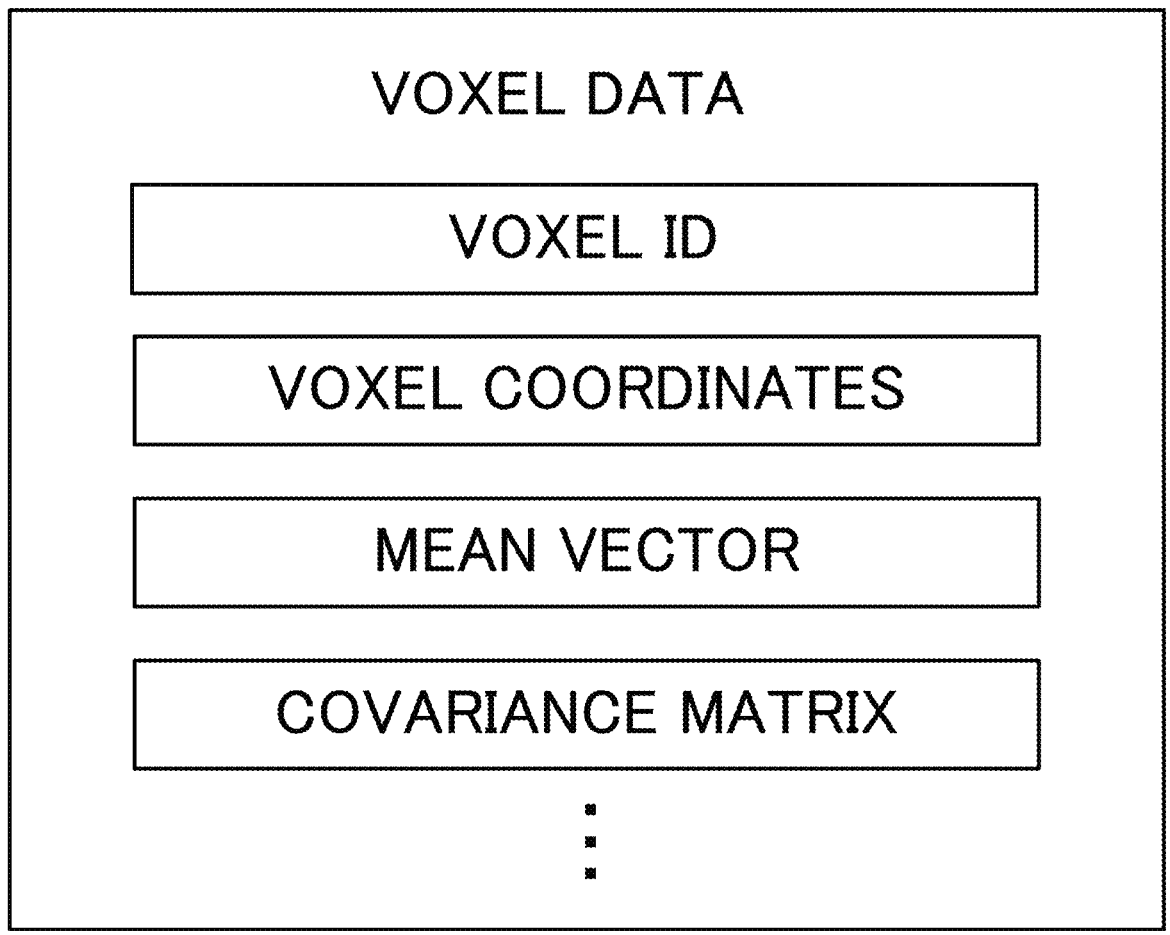
FIG. 9 It illustrates an example of a schematic data structure of voxel data.

FIG. 9 shows an example of the schematic data structure of the voxel data VD. The voxel data VD contains the parameter information for expressing point cloud data in a voxel by normal distribution. In this example, the voxel data includes a voxel ID, voxel coordinates, a mean vector, and a covariance matrix, as shown in FIG. 9.

The "voxel coordinates" indicates the absolute three-dimensional coordinates of the reference position of each voxel such as the center position of each voxel. Each voxel is a cube obtained by dividing the space into lattice-shaped spaces, and since the shape and size of each voxel are determined in advance, it is possible to identify the space of each voxel by the voxel coordinates. The voxel coordinates may be used as the voxel ID.

The "mean vector" and the "covariance matrix" show the mean vector and the covariance matrix corresponding to the parameters when the point cloud within the voxel of interest is expressed by normal distribution. It is herein assumed that the coordinates of a point "i" in a voxel "n" are expressed as the following equation and the number of point cloud in the voxel n is denoted by "$N_n$".

$$X_n(i) = [x_n(i), y_n(i), z_n(i)]^T$$

The mean vector "$\mu_m$" and the covariance matrix "$V_n$" in the voxel n are expressed by the following equations (1) and (2), respectively.

[Formula 1]
$$\mu_n = \begin{bmatrix} \overline{x_n} \\ \overline{y_n} \\ \overline{z_n} \end{bmatrix} = \frac{1}{N_n} \sum_{i=1}^{N_n} X_n(i) \tag{1}$$

[Formula 2]
$$V_n = \frac{1}{N_n - 1} \sum_{i=1}^{N_n} \{X_n(i) - \mu_n\}\{X_n(i) - \mu_n\}^T \tag{2}$$

Next, the outline of NDT scan matching using the voxel data VD will be described.

In the NDT scan matching, the following estimation parameters including the displacement on the road plane (it is herein assumed as x-y coordinate system) and the direction of the vehicle as elements are to be estimated.

$$P = [t_x, t_y, t_\psi]^T$$

Here, "$t_x$" indicates the displacement in the x direction, "$t_y$" indicates the displacement in the y direction, "$t_\psi$" indicates the yaw angle.

Further, the coordinates of the point cloud data outputted by the lidar 2 are expressed by the following equation.

$$X_L(j) = [x(j), y(j), z(j)]^T$$

Then, the mean value "L' n" of $X_L$ (j) is expressed by the following equation (3).

[Formula 3]
$$L'_n = \begin{bmatrix} L'_x \\ L'_y \\ L'_z \end{bmatrix} = \frac{1}{N} \sum_{j=1}^{N} X_L(j) \tag{3}$$

Then, using the estimation parameters P described above, when coordinate transformation is applied to the mean value L', the coordinates "Ln" after the coordinate transformation is represented by the following equation (4).

[Formula 4]
$$L_n = \begin{bmatrix} L_x \\ L_y \\ L_z \end{bmatrix} = \begin{bmatrix} \cos t_\psi & -\sin t_\psi & 0 \\ \sin t_\psi & \cos t_\psi & 0 \\ 0 & 0 & 1 \end{bmatrix} \begin{bmatrix} L'_x \\ L'_y \\ L'_z \end{bmatrix} + \begin{bmatrix} t_x \\ t_y \\ 0 \end{bmatrix} \tag{4}$$

The vehicle position estimation unit 15 searches for the voxel data VD to be associated with the processed point cloud data converted into the absolute coordinate system (also referred to as "world coordinate system") that is the same coordinate system as in the map DB 10, and calculates the evaluation function value (also referred to as "individual evaluation function value") "$E_n$" of the voxel n based on the mean vector $\mu_n$ and the covariance matrix $V_n$ included in the voxel data VD. In this instance, the own vehicle position estimation unit 15 calculates the individual evaluation function value $E_n$ of the voxel n based on the following equation (5).

[Formula 5]
$$E_n = \exp\left\{-\frac{1}{2}(L_n - \mu_n)^T V_n^{-1}(L_n - \mu_n)\right\} \quad (5)$$

The own vehicle position estimation unit 15 calculates a total evaluation function value (also referred to as "score value") "E(k)" considering all voxels to be matched, which is expressed by the following equation (6).

[Formula 6]
$$E(k) = \sum_{n=1}^{M} E_n = E_1 + E_2 + \ldots + E_M \quad (6)$$

Thereafter, the own vehicle position estimation unit 15 calculates the estimation parameters P which maximize the score value E(k) by using an arbitrary root finding algorithm such as the Newton method. Then, the own-vehicle position estimation unit 15 calculates the more accurate estimated own-vehicle position "X^ (k)" using the following equation (7) by applying the estimation parameters P to the estimated own-vehicle position "X⁻(k)" which is temporarily calculated by dead reckoning.

[Formula 7]
$$\hat{X}(k) = \overline{X}(k) + P \quad (7)$$

Here, the state variable vector indicating the vehicle position at the reference time (i.e., current clock time) k to be calculated is expressed as "X⁻(k)" or "X^(k)".

Figure 10:
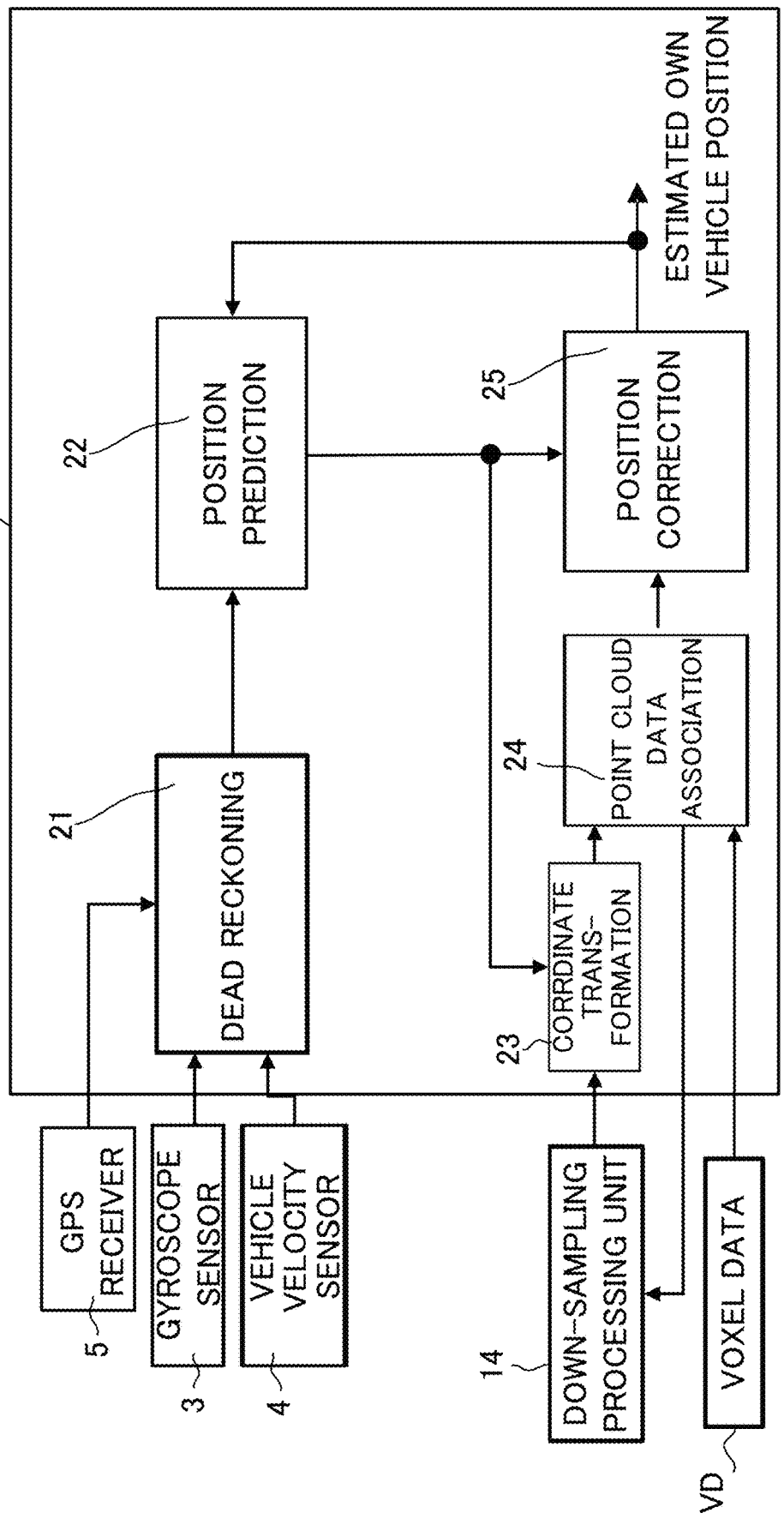
FIG. 10 It is an example of a functional block of an own vehicle position estimation unit.

FIG. 10 is an example of the functional blocks of the own vehicle position estimation unit 15. As shown in FIG. 10, the own vehicle position estimation unit 15 includes a dead reckoning block 21, a position prediction block 22, a coordinate transformation block 23, a point cloud data association block 24, and a position correction block 25.

The dead reckoning block 21 uses the movement velocity and the angular velocity of the vehicle based on the output from the gyroscope sensor 3, the vehicle velocity sensor 4, and GPS receiver 5 or the like to determine the movement distance and the azimuth change from the preceding time. The position prediction block 22 calculates the predicted own vehicle position X⁻(k) at the time k by adding the obtained movement distance and the azimuth change to the estimated own vehicle position X (k-1) at the time k-1 calculated in the preceding measurement updating step.

The coordinate transformation block 23 transforms the processed point cloud data after down-sampling outputted from the down-sampling process unit 14 into data in the world coordinate system that is the same coordinate system as the map DB 10. In this case, for example, based on the predicted own vehicle position outputted by the position prediction block 22 at the time k, the coordinate transformation block 23 performs coordinate transformation of the processed point cloud data at the time k. Instead of applying the above-described coordinate transformation to the processed point cloud data after down-sampling, the above-described coordinate transformation may be applied to the point cloud data before down-sampling. In this case, the down-sampling processing unit 14 generates the processed point cloud data in the world coordinate system obtained by down-sampling the point cloud data in the world coordinate system after the coordinate transformation. It is noted that the process of transforming the point cloud data in the lidar coordinate system with respect to the lidar installed in the vehicle to the vehicle coordinate system, and the process of transforming the vehicle coordinate system to the world coordinate system are disclosed in the International Publication WO2019/188745 and the like, for example.

The point cloud data association block 24 matches the processed point cloud data in the world coordinate system outputted by the coordinate transformation block 23 to the voxel data VD represented by the same world coordinate system to thereby associate the processed point cloud data with the voxel. The position correction block 25 calculates the individual evaluation function value based on the equation (5) for each voxel that is associated with the processed point cloud data, and calculates the estimation parameters P which maximize the score value E (k) based on the equation (6). Then, the position correction block 25 calculates the estimated own vehicle position X^(k) by applying the estimation parameters P determined at the time k to the predicted own vehicle position X⁻(k) outputted by the position predicting block 22 based on the equation (7).

Here, a specific procedure of the association between the measurement points and the voxel data VD will be supplemented with a simple example.

Figure 11:
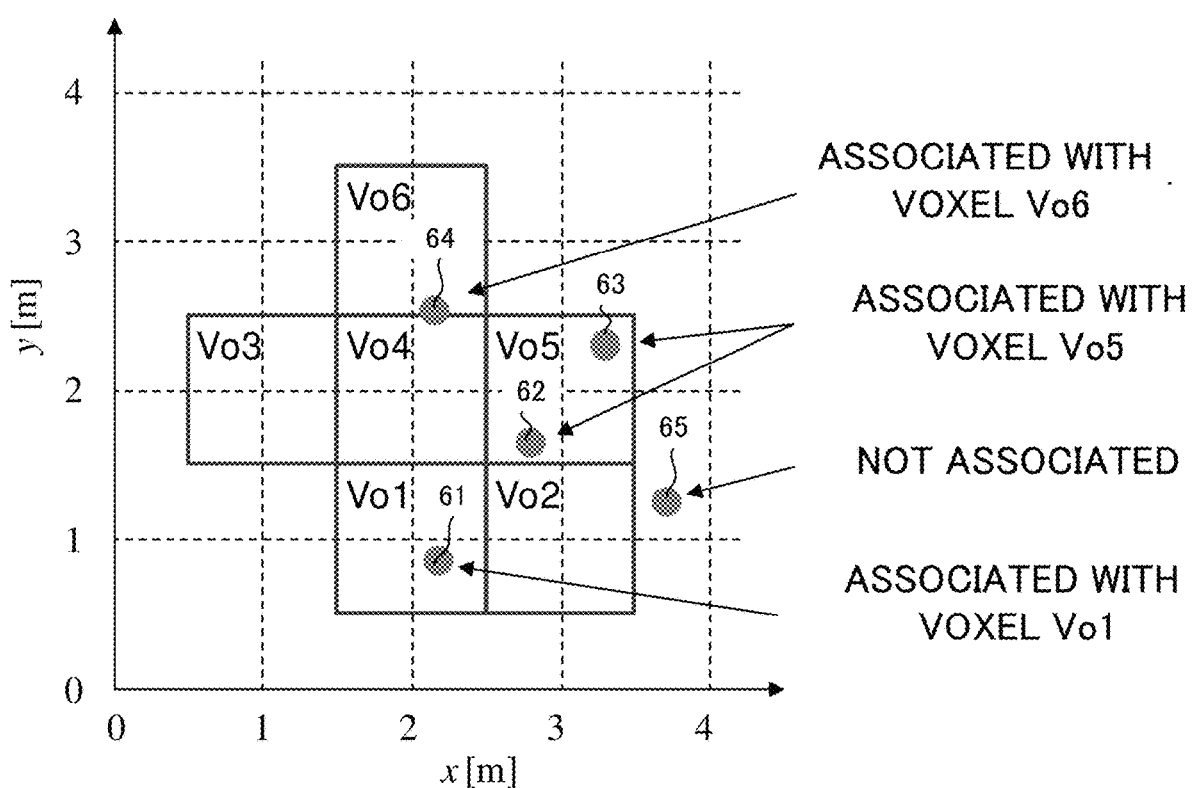
FIG. 11 It illustrates a positional relation between voxels having corresponding voxel data and measurement points each of which indicates a position around the voxels on a two-dimensional plane in the world coordinate system.

FIG. 11 shows the positional relation between the voxels "Vo1" to "Vo6", which have corresponding voxel data VD, on the x-y two-dimensional plane in the world coordinate system and the measurement points 61 to 65 indicating the positions at or near these voxels. Here, for convenience of explanation, it is assumed that the z-coordinate, in the world coordinate system, of the center positions of the voxels Vo1 to Vo6 is equal to the z-coordinate, in the world coordinate system, of the measurement points 61 to 65.

First, the coordinate transformation block 23 converts the point cloud data including the measurement points 61 to 65 to data in the world coordinate system. Thereafter, the point cloud data association block 24 rounds off the fractions of the measurement points 61 to 65 in the world coordinate system. In the example shown in FIG. 11, since the size of each voxel that is a cube is 1 meter, the point cloud data association block 24 rounds off the decimal fractions of the x, y, and z coordinates of the measurement points 61 to 65, respectively.

Next, the point cloud data association block 24 determines the voxels corresponding to the respective measurement points 61 to 65 by matching the voxel data VD corresponding to the voxels Vo1 to Vo6 to the coordinates of the measurement points 61 to 65. In the example shown in FIG. 11, since the coordinates (x, y) of the measurement point 61 after the above-described rounding are (2, 1), the point cloud data association block 24 associates the measurement point 61 with the voxel Vo1. Similarly, since the coordinates (x, y) of the measurement point 62 and the measurement point 63 after the rounding described above are (3, 2), the point cloud data association block 24 associates the measurement point 62 and the measurement point 63 with the voxel Vo5. Further, since the coordinates (x, y) of the measurement point 64 after the above-described rounding is (2, 3), the point cloud data association block 24 associates the measurement point 64 with the voxel Vo6. On the other hand, since the coordinates (x, y) of the measurement point 65 after the above-described rounding is (4, 1), the point cloud data association block 24 determines that there is no voxel data VD to be associated with the measurement point 65. Thereafter, the position correction block 25 performs estimation of the estimation parameters P using the measurement points and the voxel data VD which are associated by the point cloud data association block 24. In this case, the number of measurement points after downsampling is five, but the associated measurement points number Nc is four. As described above, the associated measurement points number Nc is reduced when it is situated in a sparse space where there are few structures around the road, or when the occlusion occurs due to the presence of another vehicle in the vicinity of the own vehicle.

(5) Processing Flow

Figure 12:
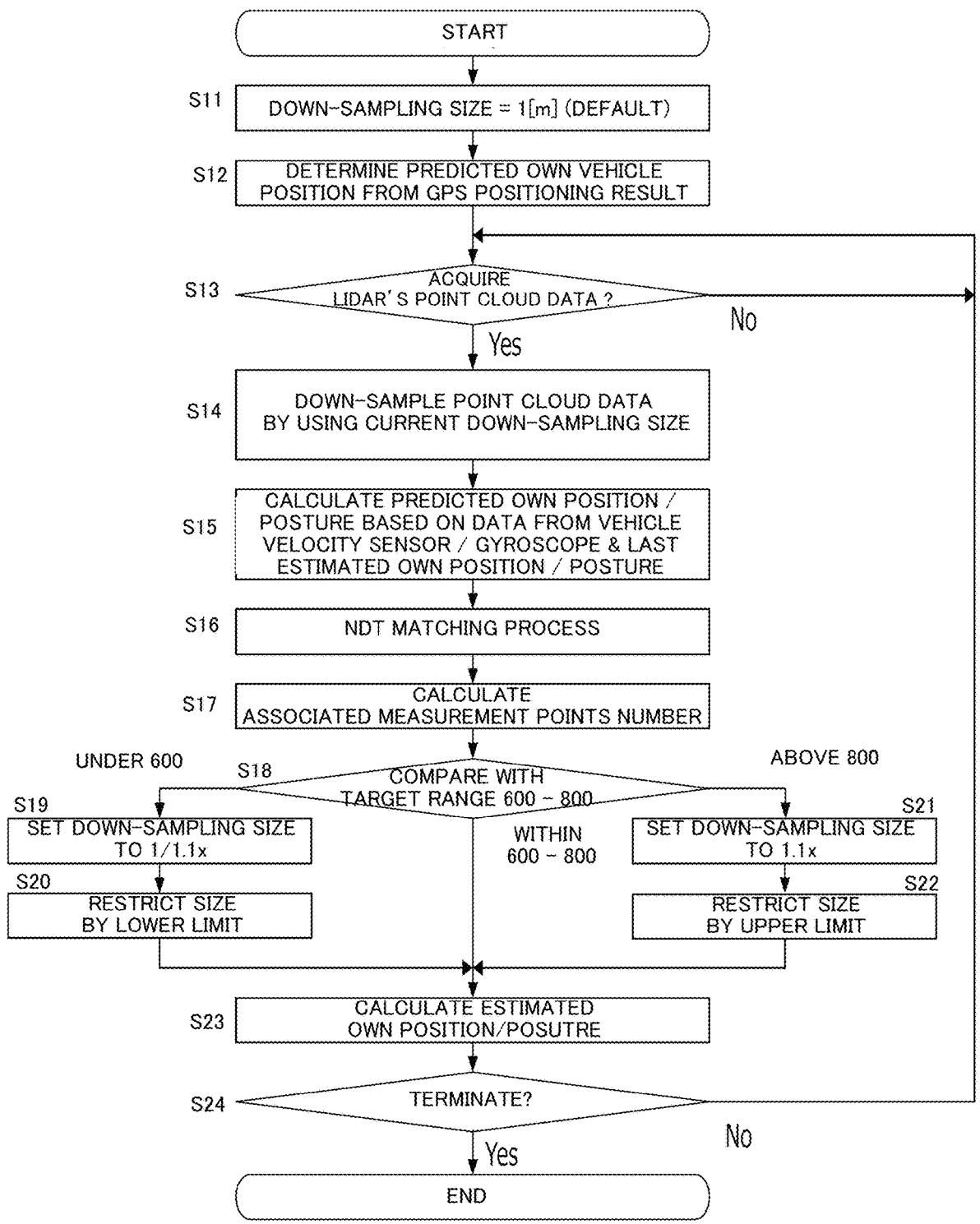
FIG. 12 It illustrates an example of a flowchart showing a procedure of the process regarding the own vehicle position estimation.

FIG. 12 is an example of a flowchart illustrating a procedure of the process regarding the own vehicle position estimation that is executed by the controller 13 of the in-vehicle device 1. The controller 13 starts the process of the flowchart shown in FIG. 12 when it is necessary to perform self position estimation, such as when the power is turned on.

First, the controller 13 sets the size of the down-sampling to a default value (step S11). Here, for example, it is assumed that the size of the down-sampling is 1 meter in any of the traveling direction, the lateral direction, and the height direction. Next, the controller 13 determines the predicted own vehicle position based on the positioning result from the GPS receiver 5 (step S12).

Then, the controller 13 determines whether or not it is possible to acquire the point cloud data from the lidar 2 (step S13). Then, if it is impossible to obtain the point cloud data from the lidar 2 (step S13; No), the controller 13 continues to make the determination at step S13. In addition, during a period in which the point cloud data cannot be acquired, the controller 13 determines the predicted own vehicle position on the basis of the positioning result from the GPS receiver 5. The controller 13 may determine the predicted own vehicle position based on not only the positioning results from the GPS receiver 5 but also any output signal other than the point cloud data from any sensors.

Then, if the controller 13 can acquire the point cloud data from the lidar 2 (step S13; Yes), the controller 13 performs the down-sampling of the point cloud data acquired in one scanning cycle of the lidar 2 at the current clock time using a current set value of the size of down-sampling (step S14). In this instance, the set value of the size of the down-sampling corresponds to the default value determined at step S11 or the updated value determined at step S19 to step S22 performed immediately before.

Then, the controller 13 determines the movement distance and the azimuth change from the preceding time by using the movement velocity and the angular velocity of the vehicle based on the output from the gyroscope sensor 3 and the vehicle velocity sensor 4 or the like. Accordingly, the position prediction block 22 calculates the predicted own vehicle position (which may include angle(s) of the posture) at the current clock time from the estimated own vehicle position (which may include angle(s) of the posture such as the yaw angle) obtained at the immediately-before clock time (i.e., preceding clock time) (step S15). When the estimated own vehicle position at the immediately-before clock time is not calculated (i.e., when the process at step S23 is not executed), the controller 13 may perform the process at step S15 by using the predicted own vehicle position determined at step S12 as the estimated own vehicle position.

The controller 13 then performs the NDT matching process (step S16). In this instance, the controller 13 performs a process of converting the processed point cloud data into data in the world coordinate system, and a process of associating the processed point cloud data in the world coordinate system with the voxels having the corresponding voxel data VD. The controller 13 may further perform the process of calculating the estimated own vehicle position (including angle(s) of the posture such as the yaw angle) at the current clock time based on NDT matching.

Further, the controller 13 calculates the associated measurement points number Nc based on the association result between the processed point cloud data and the voxel data VD in the NDT matching process (step S17). The controller 13 compares the associated measurement points number Nc with the target range $R_{Nc}$ indicated by the target range information 9 (step S18). Hereinafter, as an example, a description will be given of the case that the target range $R_{Nc}$ is 600 to 800.

When the associated measurement points number Nc is less than 600 corresponding to the lower limit of the target range $R_{Nc}$, the controller 13 changes the set value of the size of the down-sampling to 1/1.1 times thereof (step S19). It is noted that "1/1.1" is an example, and that the controller 13 may change the set value described above by subtraction of a positive value or by multiplying by a value less than 1. When the lower limit of the size of the down-sampling is provided, the controller 13 restricts the change of the set value of the size of the down-sampling so that the set value is not less than the lower limit (step S20).

Further, when the associated measurement points number Nc is greater than 800 corresponding to the upper limit of the target range $R_{Nc}$, the controller 13 changes the set value of the size of the down sampling to 1.1 times thereof (step S21). It is noted that "1.1" is an example and that the controller 13 may change the above-described set value by addition of a positive value or by multiplying by a value greater than 1. When the upper limit of the size of the down-sampling is provided, the controller 13 restricts the change of the set value of the size of the down-sampling so that the size after the change does not exceed the upper limit (step S22). The controller 13 maintains the set value of the size of the down-sampling when the associated measurement points number Nc belongs to the target range $R_{Nc}$.

Then, the controller 13 calculates the estimated own vehicle position (including the angles of the posture such as the yaw angle) at the current clock time based on the NDT matching (step S23). Then, the controller 13 determine whether or not to terminate the own vehicle position estimation process (step S24). Then, when it is determined that the own vehicle position estimation process should be terminated (step S24; Yes), the controller 13 ends the process of the flowchart. On the other hand, when the own vehicle position estimation process should not be terminated (step S24; No), the controller 13 gets back to the process at step S13 and performs estimation of the own vehicle position at the subsequent clock time.

(6) Modifications

Hereinafter, a description will be given of preferred modifications to the above-described embodiment. The following modifications may be applied to the embodiment in any combination.

(First Modification)

The in-vehicle device 1 may fix the size of the down-sampling in a direction (also referred to as a "low accuracy direction") in which the position estimation accuracy is relatively poor among the directions constituting the coordinate axes of the three-dimensional coordinate system that is the target space of down-sampling, and adaptively change the size of the down-sampling in the other directions based on the above-described embodiment. The low accuracy direction is, for example, a traveling direction. It is noted that the low accuracy direction may be the lateral direction or the height direction.

In this case, for example, depending on the specifications of the lidar 2 or the specifications of the driving support system to be used, the low-accuracy direction is empirically specified before the execution of the own-vehicle position estimation process, and a fixed value of the size of the down-sampling in the low-accuracy direction is stored in the memory 12. Then, the in-vehicle device 1 sets the size of the down-sampling in the low accuracy direction to a fixed value stored in the memory 12 while changing the size of the down-sampling in the other directions according to the processes at step S19 to step S22 in the flowchart shown in FIG. 12. In this way, the in-vehicle device 1 can ensure the resolution of the processed point cloud data in the low-accuracy direction, which makes it possible to reliably suppress the decrease in position estimation accuracy in the low accuracy direction.

(Second Modification)

The in-vehicle device 1 may set the size of the down-sampling in the low accuracy direction to a size less than the size of the down-sampling in the other directions.

For example, the in-vehicle device 1 determines the size of the down-sampling in each direction based on: the size (also referred to as "reference size") determined based on the associated measurement points number Nc; and the ratio set for each direction in advance according to the accuracy and importance. For example, the in-vehicle device 1 sets the size of down-sampling in the traveling direction to the half (½ times) of the reference size determined at step S11 or steps S19 to S22 in the flowchart shown in FIG. 12. On the other hand, the in-vehicle device 1 sets the size of the down-sampling in the lateral direction to be twice of the reference size, and the size of the down-sampling in the height direction to be the same (equal magnification) as the reference size. In this way, the in-vehicle device 1 can always increase the resolution of the processed point cloud data in the low accuracy direction relative to the resolution in the other directions.

(Third Modification)

The in-vehicle device 1 measures the processing time (the length of the process time) of the own-vehicle position estimation process (including down-sampling) to be executed at each clock time and may set the size of the down-sampling in accordance with the measured processing time.

For example, when the execution cycle period of the own vehicle position estimation process is 83.3 ms, the in-vehicle device 1 reduces the size of the down-sampling by a predetermined value or a predetermined rate when the processing time is shorter than 30 ms. On the other hand, the in-vehicle device 1 increases the size of the down-sampling by a predetermined value or a predetermined rate when the processing time is longer than 70 ms. In addition, the in-vehicle device 1 maintains the size of the down-sampling when the process time is within the range from 30 ms to 70 ms. The in-vehicle device 1 may change the size of the down-sampling based on this modification, for example, after the execution of the process at step S23 in FIG. 12, or immediately before or immediately after the processes at step S18 to step S22.

According to this modification, the in-vehicle device 1 can suitably set the size of the down-sampling so that the processing time keeps within an appropriate range with respect to the execution cycle period.

(Fourth Modification)

The configuration of the driving support system shown in FIG. 1 is an example, and therefore the configuration of the driving support system to which the present invention can be applied is not limited to the configuration shown in FIG. 1. For example, in the driving support system, the electronic control unit of the vehicle may execute the process to be execute by the down sampling processing unit 14 and the own vehicle position estimation unit 15 of the in-vehicle device 1, in place of the in-vehicle device 1. In this instance, the map DB 10 is stored in, for example, a storage unit in the vehicle or a server device that performs data communication with the vehicle, and the electronic control unit of the vehicle performs the own vehicle position estimation based on the down-sampling and the NDT scan matching, etc. by referring to the map DB 10.

(Fifth Modification)

The data structure of the voxel data VD is not limited to a data structure that includes a mean vector and a covariance matrix, as shown in FIG. 9. For example, the voxel data VD may directly include the point cloud data measured by a measurement vehicle to be used in calculating the mean vector and the covariance matrix.

(7) Consideration based on Experimental Results

Next, a description will be given of the experimental results on the embodiment described above (also includes the modifications). The applicant drove a vehicle equipped with two lidars in front and two lidars in rear along a driving route and performed position estimation based on NDT by matching the lidars point cloud data obtained during the driving to the voxel data (ND map) prepared in advance for the driving route, wherein each lidar has a horizontal viewing angle of 60 degrees and an operating frequency 12 Hz (83.3 ms cycle period). In order to evaluate the accuracy, RTK-GPS position data is used as the correct answer position data.

Figure 13A:
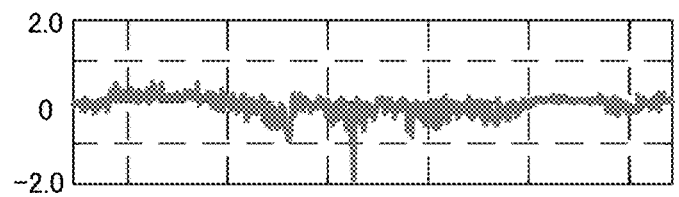
FIG. 13 It illustrates the results of the own vehicle position estimation by NDT process after the down-sampling using 0.5 meter cubic grids.
Figure 13B:
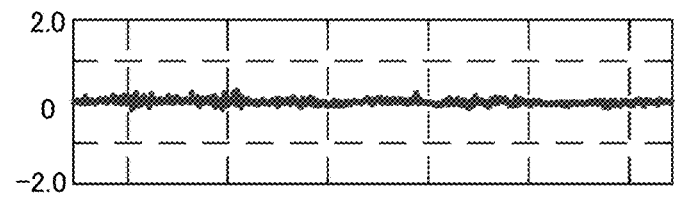
Figure 13C:
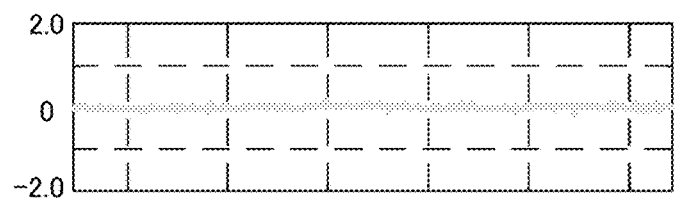
Figure 13D:
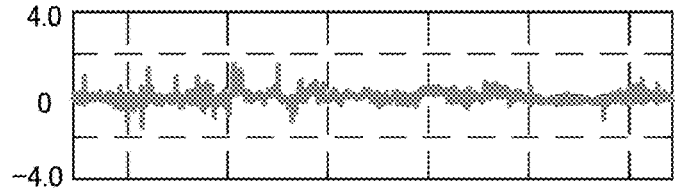
Figure 13E:
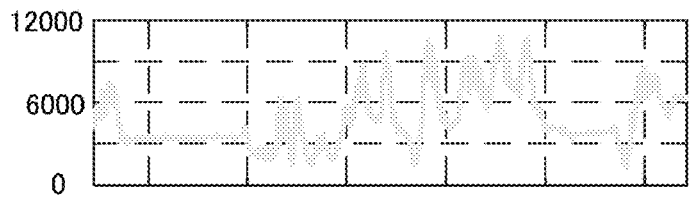
Figure 13F:
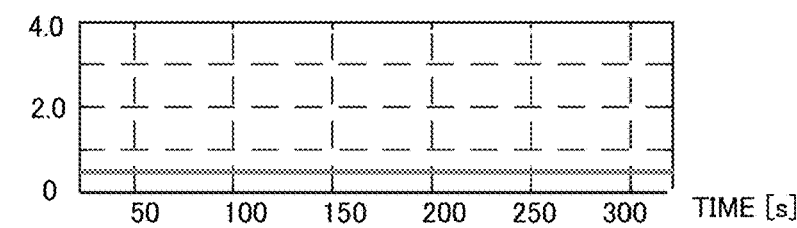
Figure 14A:
FIG. 14 It illustrates the results of the own vehicle position estimation by NDT process after the down-sampling using 0.5 meter cubic grids.
Figure 14B:
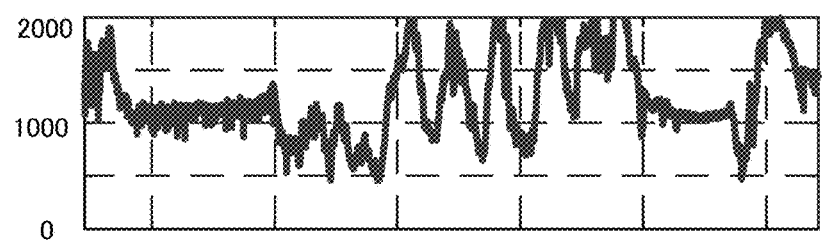
Figure 14C:
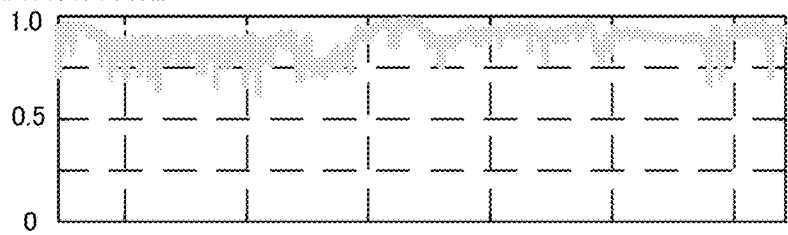
Figure 14D:
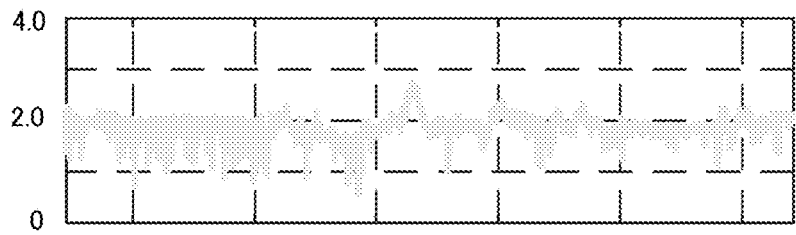
Figure 14E:
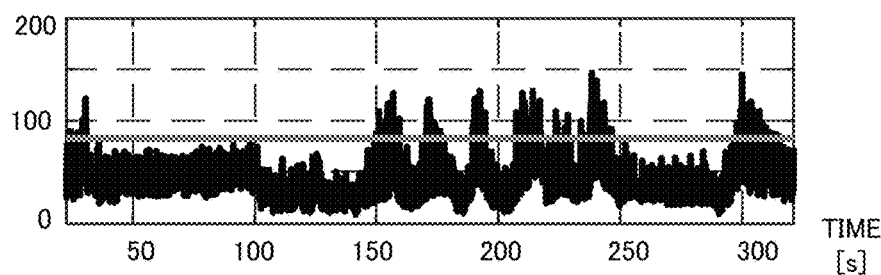

FIGS. 13A to 13F and FIGS. 14A to 14E show the results of the down-sampling process with 0.5 meter of the cubic grid size and the own vehicle position estimation by NDT process. Here, with respect to the positioning result of RTK-GPS, FIG. 13A shows the error in the traveling direction, FIG. 13B shows the error in the lateral direction, FIG. 13C shows the error in the height direction, FIG. 13D shows the error in the yaw angle, FIG. 13E shows the number of measurement points of the point cloud data before down-sampling, FIG. 13F shows the size of down-sampling, respectively. Further, FIG. 14A shows the number of measurement points of the processed point cloud data after down-sampling, FIG. 14B shows the associated measurement points number Nc, FIG. 14C shows the ratio (also referred to as "association ratio") of the associated measurement points number Nc to the number of measurement points of the processed point cloud data. FIG. 14D shows the score value E (k), FIG. 14E shows the processing time, respectively. In FIG. 14E, the cycle period (83.3 ms) of the lidar is shown by a horizontal line.

Here, as shown in FIG. 14E, there is a period in which the processing time has been beyond the cycle period 83.3 ms of the lidar. In this period, the number of measurement points before down-sampling shown in FIG. 13E and the number of measurement points after down-sampling shown in FIG. 14A, and the associated measurement points number Nc shown in FIG. 14(B) are increased, respectively. Thus, it is grasped that there is a positive correlation between the number of point cloud data and the processing time.

Further, as shown in FIG. 13A, instantaneously the error in the travelling direction at around 170 s is increased. It can be inferred that the error in the estimated position occurred due to the excess processing time in excess of the lidar's cycle period in addition to the circumstance that the traveling place at this time was an area having few features in the traveling direction.

Thus, it is necessary to perform such process that meets the lidar's cycle period. However, when performing the down-sampling with a fixed size, there are cases where it is impossible to solve this issue.

Figure 15A:
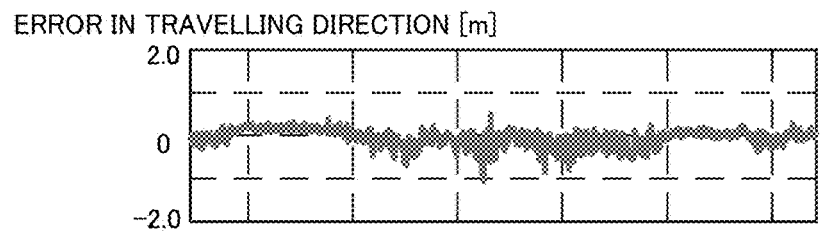
FIG. 15 It illustrates the results of the own vehicle position estimation by NDT process after the down-sampling using 2.0 meter cubic grids.
Figure 15B:
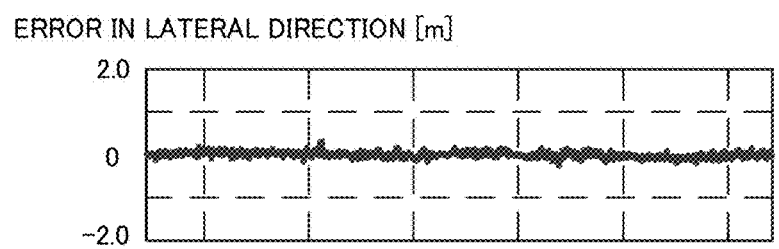
Figure 15C:
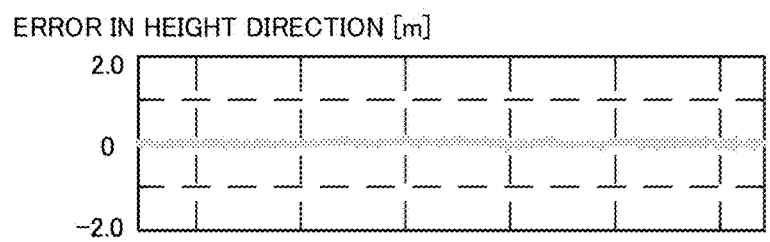
Figure 15D:
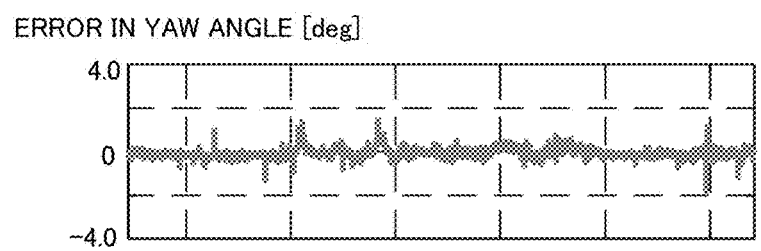
Figure 15E:
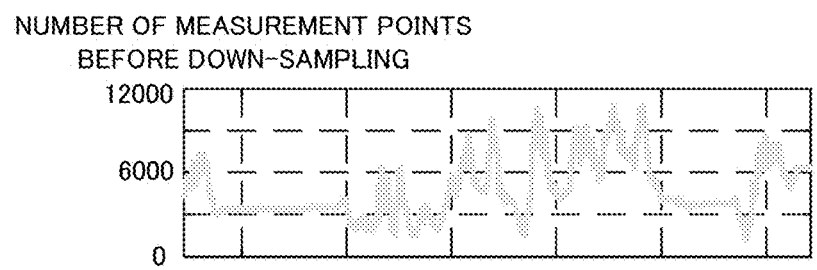
Figure 15F:
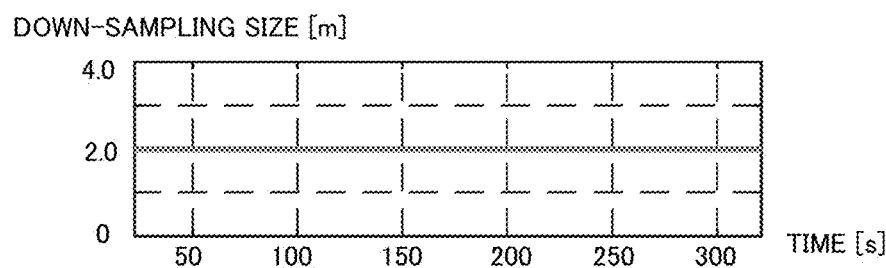

FIGS. 15A to 15F and FIGS. 16A to 16E show the results of the down-sampling process with 2.0 meter of the cubic grid size and the own vehicle position estimation by NDT process. Here, with respect to the positioning result of RTK-GPS, FIG. 15A shows the error in the traveling direction, FIG. 15B shows the error in the lateral direction, FIG. 15C shows the error in the height direction, FIG. 15D shows the error in the yaw angle, FIG. 15E shows the number of measurement points of the point cloud data before down-sampling, and FIG. 15F shows the size of down-sampling, respectively. Further, FIG. 16A shows the number of measurement points of the processed point cloud data after down-sampling, FIG. 16B shows the associated measurement points number Nc, FIG. 16C shows the association rate, FIG. 16D shows the score value E (k), and FIG. 16E shows the processing time, respectively. In FIG. 16E, the lidar's cycle period (83.3 ms) is shown by a horizontal line.

In this case, since the size of the down-sampling is larger than the size used in the example shown in FIGS. 13A to 13F and FIG. 14A to 14E, the associated measurement points number Nc shown in FIG. 16B is reduced, and the processing time shown in FIG. 16E is also reduced. As a consequence, the processing time at any time is within 83.3 ms of the lidar's cycle period. On the other hand, the error in the traveling direction shown in FIG. 15A is increased (particularly during the period from 250s to 280s). This is inferred to be caused by the decrease in the resolution of the processed point cloud data and the decrease in the number of measurement points after down-sampling. Generally, if the number of measurement points of the processed point cloud data is too small, the stability could be lowered due to the insufficient number of measurement points to be matched in NDT process.

Thus, even when the size of the down-sampling is set to a larger fixed size, it is impossible to achieve both the maintenance of the own vehicle position estimation accuracy and the suppression of the processing time.

Figure 17A:
FIG. 17 It illustrates the results of down-sampling and the own vehicle position estimation by NDP process performed according to the procedure shown in FIG. 12.
Figure 17B:
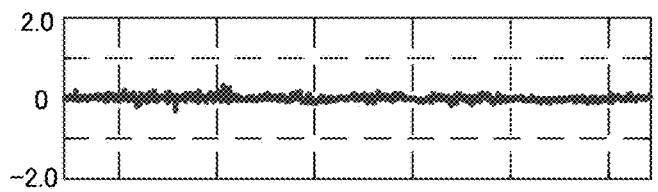
Figure 17C:
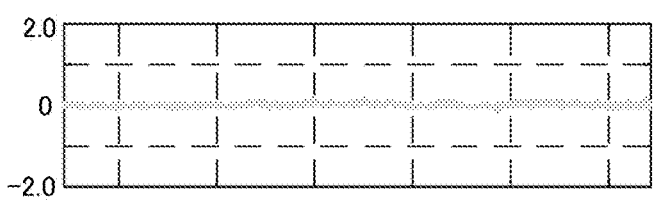
Figure 17D:
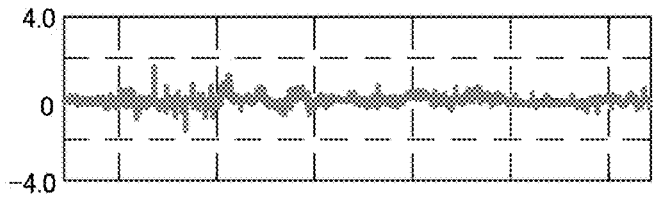
Figure 17E:
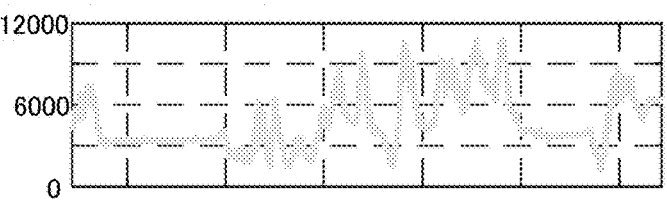
Figure 17F:
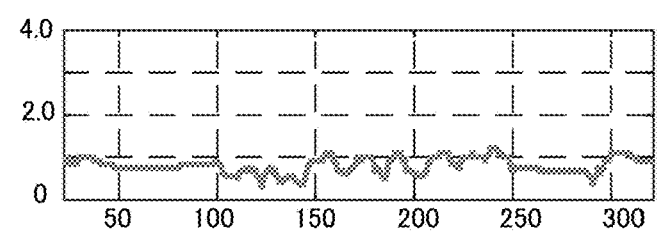
Figure 18A:
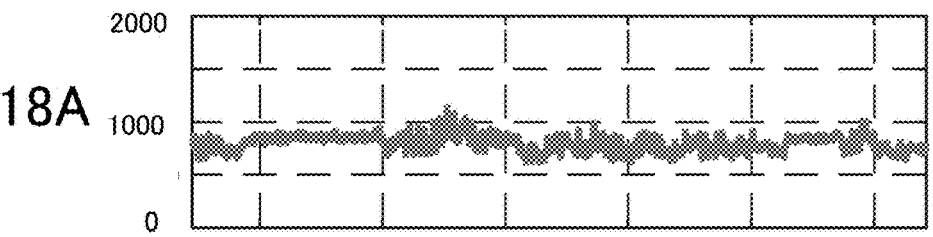
FIG. 18 It illustrates the results of down-sampling and the own vehicle position estimation by NDP process performed according to the procedure shown in FIG. 12.
Figure 18B:
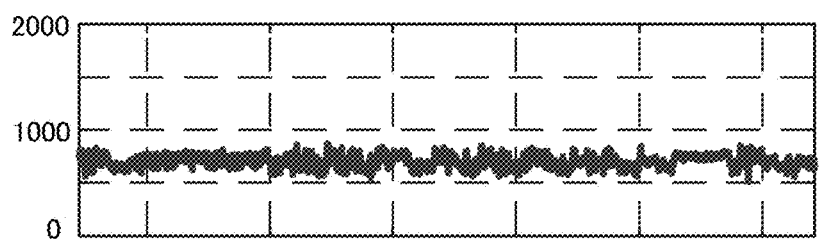
Figure 18C:
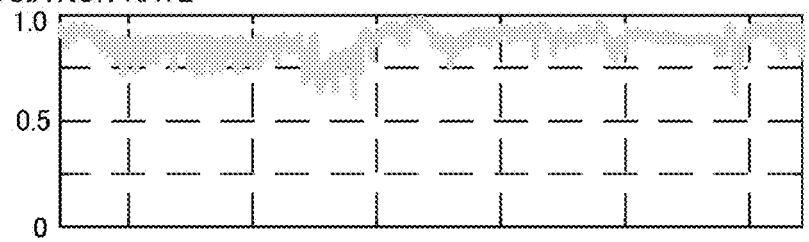
Figure 18D:
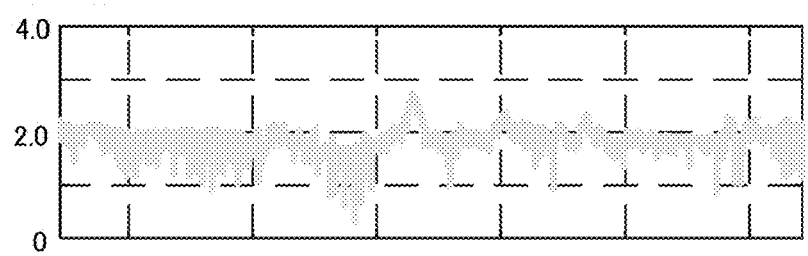
Figure 18E:
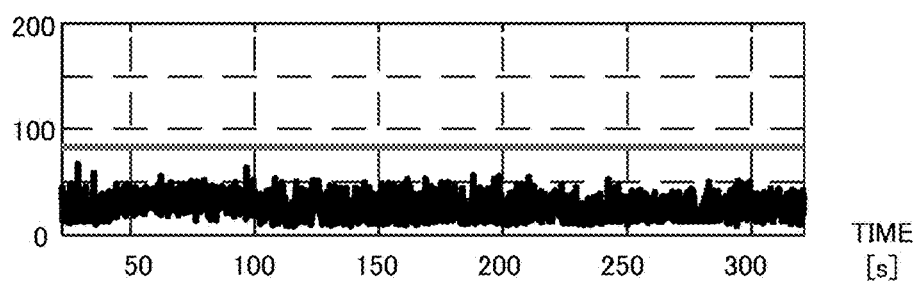

FIGS. 17A to 17F and FIGS. 18A to 18E show the results of down-sampling and own vehicle position estimation by NDT process according to the present embodiment's processing procedure shown in FIG. 12. Here, with respect to the positioning result of RTK-GPS, FIG. 17A shows the error in the traveling direction, FIG. 17B shows the error in the lateral direction, FIG. 17C shows the error in the height direction, FIG. 17D shows the error in the yaw angle, FIG. 17E shows the number of measurement points of the point cloud data before down-sampling, and FIG. 17F shows the size of down-sampling, respectively. Further, FIG. 18A shows the number of measurement points of the processed point cloud data after down-sampling, FIG. 18B shows the associated measurement points number Nc, FIG. 18C shows the association rate, FIG. 18D shows the score value E (k), FIG. 18E shows the processing time, respectively. In FIG. 18E, the lidar's cycle period (83.3 ms) is shown by a horizontal line.

In this case, the size of the down-sampling dynamically varies, as shown in FIG. 17F. Consequently, the processing time shown in FIG. 18E is constantly below 83.3 ms that is the lidar's cycle period, and the error in the travelling direction shown in FIG. 17A is also suitably suppressed.

Thus, by adaptively changing the size of the down-sampling based on the embodiment, it is possible to achieve both the maintenance of the own vehicle position estimation accuracy and the suppression of the processing time.

Figure 20A:
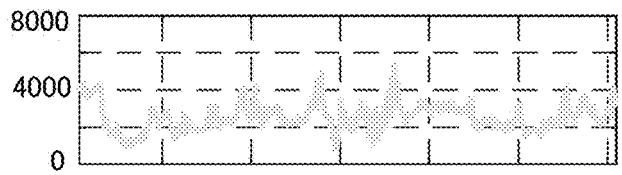
FIG. 20 It illustrates the results under the same situation as in FIG. 19 provided that the size of down-sampling is determined so that the number of measurement points after the down-sampling is within the range from 600 to 800.
Figure 20B:
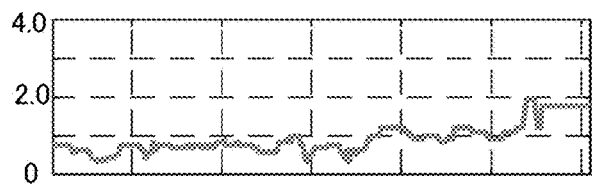
Figure 20C:
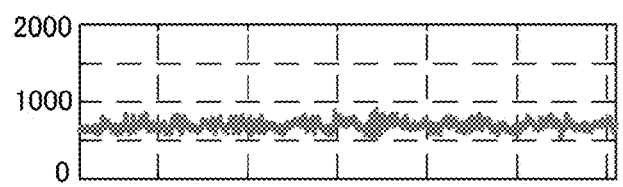
Figure 20D:
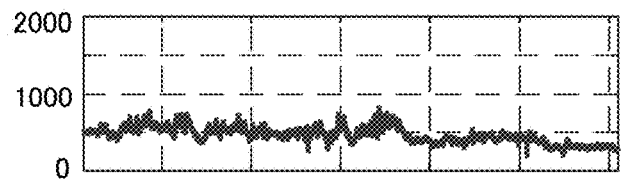
Figure 20E:
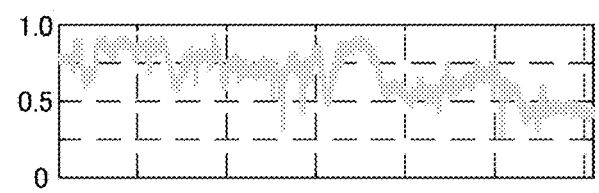
Figure 20F:
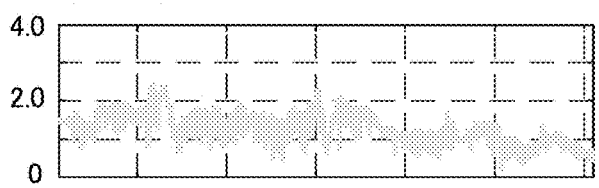
Figure 20G:
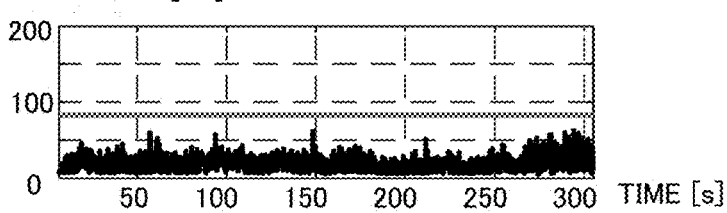

FIGS. 19A to 19G show the results of down-sampling and own vehicle position estimation by NDT process according to the present embodiment's processing procedure shown in FIG. 12 when occlusion by other vehicles occurs. In addition, FIGS. 20A to 20G show the results, under the same circumstances as those in FIG. 19A to 19G, when the size of the down-sampling is determined so that not the associated measurement points number Nc but the number of the measurement points after the down-sampling is controlled to fall under the range from 600 to 800. Here, FIG. 19A and FIG. 20A show the number of measurement points before down-sampling, FIG. 19B and FIG. 20B show the size of down-sampling, FIG. 19C and FIG. 20C show the number of measurement points after down-sampling, FIG. 19D and FIG. 20D show the associated measurement points number Nc, FIG. 19E and FIG. 20E show the association rate, FIG. 19F and FIG. 20F show the score value E (k), and FIG. 19G and FIG. 20G show the processing time, respectively.

In these cases, occlusion by other vehicles has occurred for a while since 180 s. When the size of the down-sampling is controlled using the number of measurement points before being associated with the voxel data VD as shown in FIGS. 20A to 20G, the associated measurement points number Nc becomes too small when occlusion occurs. Consequently, as shown in FIG. during the period in which occlusion occurs, the associated measurement points number Nc is lowered. On the other hand, when controlling the size of the down-sampling according to the present embodiment, as shown in FIG. 19D, even during the period in which occlusion occurs, the variation in the associated measurement points number Nc is small. Therefore, in the example shown in FIGS. 20A to 20G, the stability of the position estimation is lower than in the example shown FIGS. 19A to 19G. From these examples, it can be seen that when there are many measurement points that cannot be associated with voxel data, that is generated based on stationary structure, due to occlusion, it is not good to perform control so that the number of the measurement point after down-sampling is within a target range.

Figure 21A:
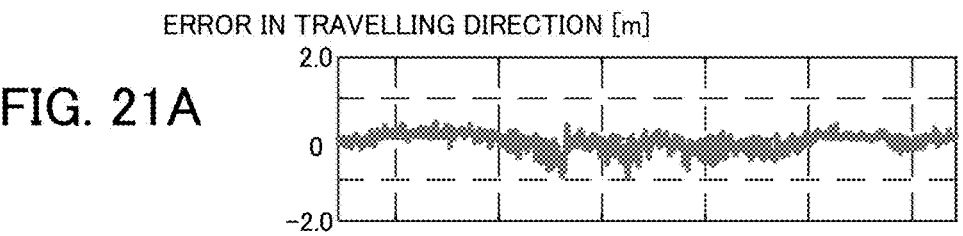
FIG. 21 It illustrates the results of the own vehicle position estimation by NDT process when the size of the down-sampling in the traveling direction is fixed to 0.5 meter according to a first modification while the size of the down-sampling in the lateral direction and the height direction is adaptively changed.
Figure 21B:
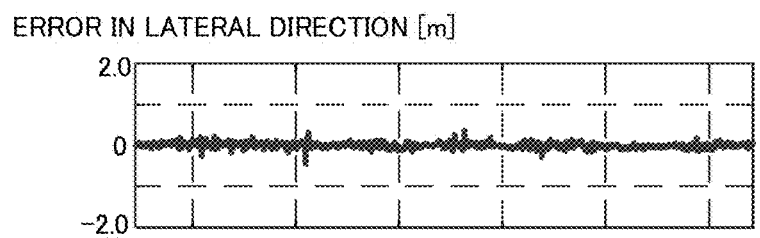
Figure 21C:
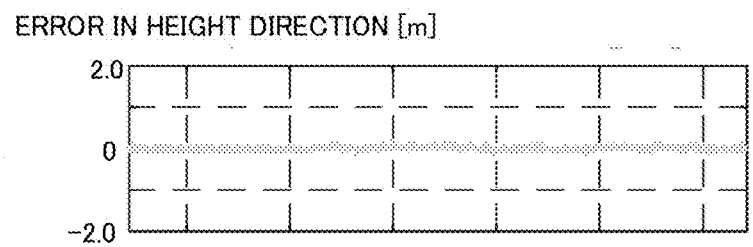
Figure 21D:
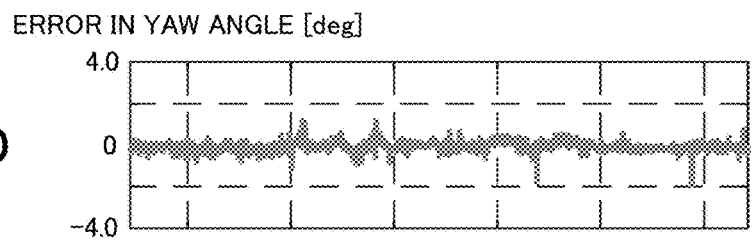
Figure 21E:
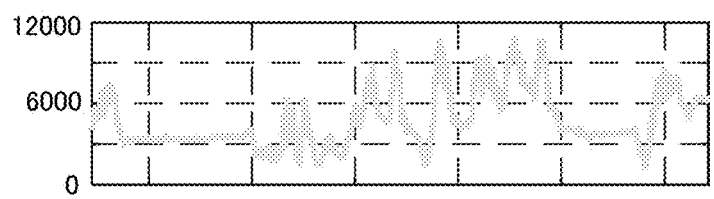
Figure 21F:
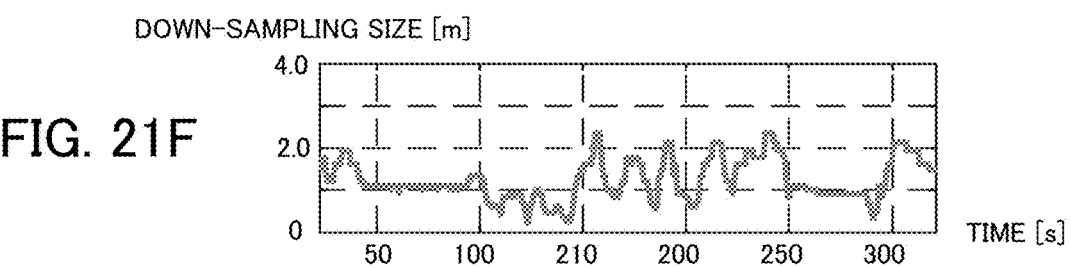
Figure 22A:
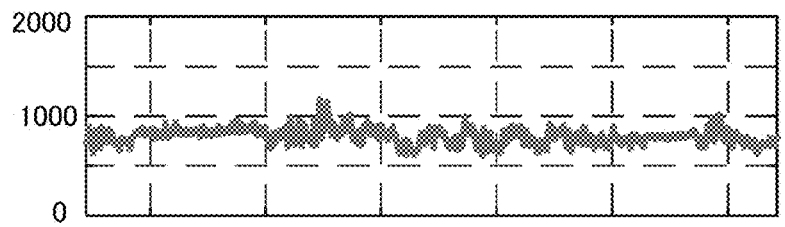
FIG. 22 It illustrates the results of the own vehicle position estimation by NDT process when the size of the down-sampling in the traveling direction is fixed to 0.5 meter according to a first modification while the size of the down-sampling in the lateral direction and the height direction is adaptively changed.
Figure 22B:
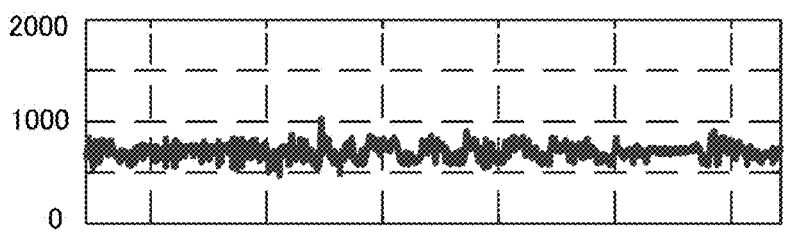
Figure 22C:
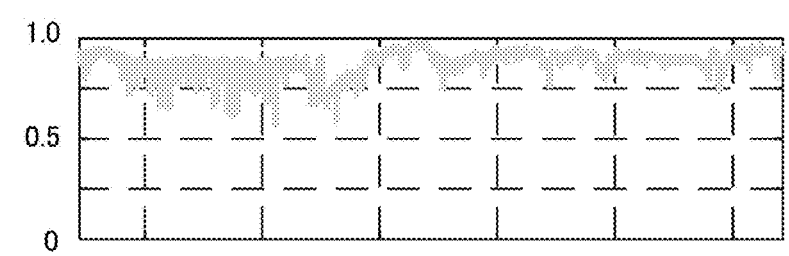
Figure 22D:
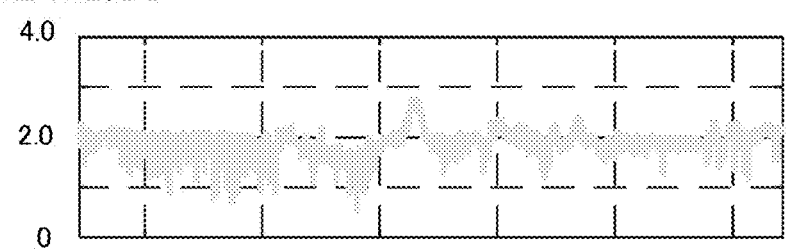
Figure 22E:
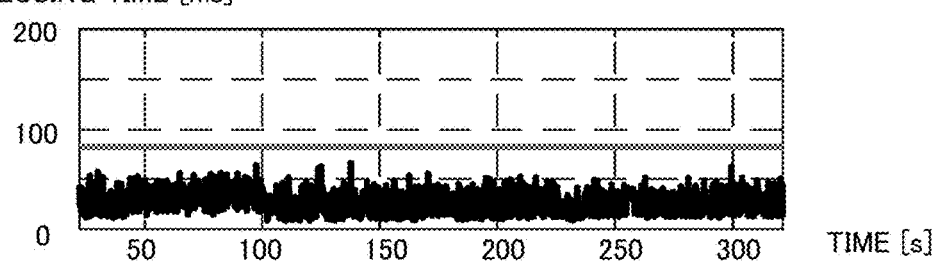

FIGS. 21A to 21F and FIGS. 22A to 22E show the results of the own vehicle position estimation by NDT process in which the size of down-sampling in the traveling direction is fixed to 0.5 meter according to the first modification and the size of down-sampling in the lateral direction and the height direction is adaptively changed. Specifically, with respect to the positioning results of RTK-GPS, FIG. 21A shows the error in the traveling direction, FIG. 21B shows the error in the lateral direction, FIG. 21C shows the error in the height direction, FIG. 21D shows the error in the yaw angle, FIG. 21E shows the number of measurement points of the point cloud data before down-sampling, and FIG. 21F shows the size of down-sampling, respectively. Further, FIG. 22A shows the number of measurement points of the processed point cloud data after down-sampling, FIG. 22B shows the associated measurement points number Nc, FIG. 22C shows the association rate, FIG. 22D shows the score value E (k), FIG. 22E shows the processing time, respectively. In FIG. 22E, the lidar's cycle period (83.3 ms) is shown by a horizontal line.

In this case, considering such facts that there are many guardrails and road shoulders on both sides of the runway, and a center median and that therefore the error in the lateral direction is better than that in the traveling direction, it uses the traveling direction as the low accuracy direction and fixes the size of down-sampling in the traveling direction at 0.5 meter. Then, since the size of down-sampling in the traveling direction is fixed at 0.5 m, as shown in FIG. 21F, the size of down-sampling in the lateral direction and the height direction are larger than the size set in the case (see FIG. 17F) when the size of down-sampling is adaptively changed including the size in the traveling direction. On the other hand, also in the first modification, by controlling the associated measurement points number Nc shown in FIG. 22B to be maintained within the range from 600 to 800, the processing time shown in FIG. 22E also suitably keeps within the lidar's cycle period.

As a result, when executing the first modification, the error in the lateral direction shown in FIG. 21B is not substantially changed while the error in the traveling direction shown in FIG. 21A (particularly around 170 s) is reduced. Thus, even in the control of the size of the down-sampling based on the first modification, it is possible to suitably achieve both the maintenance of the own vehicle position estimation accuracy and the suppression of the processing time.

As described above, the controller 13 of the in-vehicle device 1 according to the present embodiment acquires point cloud data outputted by a lidar 2. Then, the controller 13 generates processed point cloud data obtained by down-sampling the point cloud data. The controller 13 matches the processed point cloud data with voxel data VD which represents a position of an object with respect to each voxel that is a unit area and thereby associates a measurement point of the processed point cloud data with the each voxel. Then, the controller 13 changes the size of the subsequent down-sampling based on the associated measurement points number Nc which is the number of measurement points associated with the each voxel among the measurement points of the processed point cloud data. Thus, the in-vehicle device 1 can adaptively determine the size of the down-sampling and suitably realize the compatibility between the accuracy requirement of the self position estimation and the processing time requirement.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)).

While the present invention has been described with reference to the embodiments, the present invention is not limited to the above embodiments. Various modifications that can be understood by a person skilled in the art can be made to the configuration and details of the present invention within the scope of the present invention. Namely, the present invention includes, of course, various modifications that may be made by a person skilled in the art according to the entire disclosure including claims and technical ideas. In addition, all Patent and Non-Patent Literatures mentioned in this specification are incorporated by reference in its entirety.

DESCRIPTION OF REFERENCE NUMERALS

1 In-vehicle device
2 Lidar
3 Gyroscope sensor
4 Vehicle velocity sensor
5 GPS receiver
10 Map DB

What is claimed is:

1. An information processing device comprising:
a processor coupled to a memory storing instructions for the processor to function as:
an acquisition unit configured to acquire point cloud data outputted by a measurement device;
a down-sampling processing unit configured to generate processed point cloud data obtained by down-sampling the point cloud data; and
an association unit configured to match the processed point cloud data with voxel data which represents a position of an object with respect to each voxel that is a unit area and thereby associate a measurement point of the processed point cloud data with the each voxel,
wherein the down-sampling processing unit is configured to change a size of a subsequent down-sampling based on an associated measurement points number which is the number of the measurement points associated with the each voxel.

2. The information processing device according to claim 1,
wherein the down-sampling processing unit is configured to fix the size in a first direction selected from directions along which a space is divided in the down-sampling while changing the size in a direction other than the first direction based on the associated measurement points number.

3. The information processing device according to claim 2,
wherein the first direction is a traveling direction of the measurement device.

4. The information processing device according to claim 1,
wherein the down-sampling processing unit is configured to change the size based on a comparison between the associated measurement points number and a target range of the associated measurement points number.

5. The information processing device according to claim 4,
wherein the down-sampling processing unit is configured to
increase the size by a predetermined ratio or a predetermined value if the associated measurement points number is larger than an upper limit of the target range,
decrease the size by a predetermined ratio or a predetermined value if the associated measurement points number is smaller than a lower limit of the target range, and
maintain the size if the associated measurement points number is within the target range.

6. The information processing device according to claim 1, wherein the down-sampling processing unit is configured to
determine a reference size of the subsequent down-sampling based on the associated measurement points number, and determine, based on the reference size and a ratio set for each direction along which a space is divided in the down-sampling, the size for the each direction.

7. The information processing device according to claim 1, wherein the processor further functions as:
a position estimation unit configured to estimate a position of a moving object equipped with the measurement device based on a matching result between voxel data of the each voxel associated by the association unit and the measurement point associated with the each voxel.

8. The information processing device according to claim 7,
wherein the down-sampling processing unit is configured to change the size based on a processing time in the down-sampling processing unit and the position estimation unit.

9. The information processing device according to claim 8,
wherein the down-sampling processing unit is configured to change the size based on a comparison between the processing time and a target range of the processing time.

10. A control method executed by a computer, the control method comprising:
acquiring point cloud data outputted by a measurement device;
generating processed point cloud data obtained by down-sampling the point cloud data;
matching the processed point cloud data to voxel data which represents a position of an object with respect to each voxel that is a unit area and thereby associating a measurement point of the processed point cloud data with the each voxel; and
changing a size of a subsequent down-sampling based on an associated measurement points number which is the number of the measurement points associated with the each voxel.

11. A non-transitory computer readable medium storing a program executed by a computer, the program causing the computer to:
acquire point cloud data outputted by a measurement device;
generate processed point cloud data obtained by down-sampling the point cloud data;
match the processed point cloud data with voxel data which represents a position of an object with respect to each voxel that is a unit area and thereby associate a measurement point of the processed point cloud data with the each voxel; and
change a size of a subsequent down-sampling based on an associated measurement points number which is the number of the measurement points associated with the each voxel.

* * * * *